(12) United States Patent
Koo et al.

(10) Patent No.: US 10,203,728 B2
(45) Date of Patent: Feb. 12, 2019

(54) ELECTRONIC DEVICE INCLUDING COUPLING STRUCTURE

(71) Applicant: Samsung Electronics Co., Ltd, Gyeonggi-do (KR)

(72) Inventors: Younggwon Koo, Seoul (KR); Jinyoung Park, Gyeonggi-do (KR); Seungwoon Lee, Gyeonggi-do (KR); Jinseon Hwang, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/387,562

(22) Filed: Dec. 21, 2016

(65) Prior Publication Data

US 2017/0177037 A1 Jun. 22, 2017

(30) Foreign Application Priority Data

Dec. 21, 2015 (KR) .......................... 10-2015-0182710

(51) Int. Cl.
*G06F 1/16* (2006.01)
*H01R 13/24* (2006.01)
(Continued)

(52) U.S. Cl.
CPC .......... *G06F 1/1654* (2013.01); *G06F 1/1616* (2013.01); *G06F 1/1632* (2013.01);
(Continued)

(58) Field of Classification Search
CPC .... G06F 1/1654; G06F 1/1669; G06F 1/1632; G06F 1/1616; G06F 1/1662;
(Continued)

(56) References Cited

U.S. PATENT DOCUMENTS

| 9,075,566 B2* | 7/2015 | Whitt, III | .................. G06F 1/16 |
| 2013/0170131 A1* | 7/2013 | Yen | ........................ G06F 1/1632 |
| | | | 361/679.44 |
| 2014/0111915 A1* | 4/2014 | Tseng | ....................... H05K 7/14 |
| | | | 361/679.01 |

(Continued)

FOREIGN PATENT DOCUMENTS

| KR | 1020110086296 | | 7/2011 | |
| KR | 20100005953 | * | 8/2011 | ............. A45C 11/00 |

(Continued)

*Primary Examiner* — Steven T Sawyer
*Assistant Examiner* — Sagar Shrestha

(57) ABSTRACT

An electronic device having a first housing including a first surface and a second surface at a rear surface opposite of the first surface and a coupling structure disposed on the first surface. A second housing for coupling to the first housing has a third surface, a fourth surface opposite of the third surface, and a side member enclosing a space between the third and fourth surfaces. The coupling structure is connected to the side member when the second housing is coupled to the first housing, and the coupling structure comprises a recess and a moving member. When the second housing is coupled to the first housing, the moving member performs a pivotal movement about a shaft. A retainer system may enable the second housing to at least partially stay within the moving member at the recess when the second housing is not coupled to the first housing.

16 Claims, 25 Drawing Sheets

(51) Int. Cl.
*H01R 35/04* (2006.01)
*H01R 13/62* (2006.01)

(52) U.S. Cl.
CPC .......... *G06F 1/1662* (2013.01); *G06F 1/1669* (2013.01); *G06F 1/1679* (2013.01); *G06F 1/1686* (2013.01); *H01R 13/2421* (2013.01); *H01R 13/6205* (2013.01); *H01R 35/04* (2013.01); *H01R 2201/06* (2013.01)

(58) Field of Classification Search
CPC . G06F 1/1686; G06F 1/1679; H01R 13/6205; H01R 2201/06; H01R 35/04; H01R 13/2421
See application file for complete search history.

(56) References Cited

U.S. PATENT DOCUMENTS

| | | | | |
|---|---|---|---|---|
| 2014/0133080 | A1* | 5/2014 | Hwang | G06F 1/1632 361/679.17 |
| 2014/0146441 | A1* | 5/2014 | Hautamaki | H04M 1/0262 361/679.01 |
| 2015/0189962 | A1 | 7/2015 | Yeo et al. | |
| 2015/0205330 | A1* | 7/2015 | Zhang | G06F 1/1626 361/679.3 |
| 2015/0268696 | A1* | 9/2015 | Wu | G06F 1/1632 361/679.43 |

FOREIGN PATENT DOCUMENTS

| | | |
|---|---|---|
| KR | 1020150025387 | 3/2015 |
| KR | 1020150081213 | 7/2015 |

\* cited by examiner

ELECTRONIC DEVICE INCLUDING COUPLING STRUCTURE

CROSS-REFERENCE TO RELATED APPLICATION(S) AND CLAIM OF PRIORITY

The present application is related to and claims the benefit under 35 U.S.C. § 119(a) of a Korean patent application filed on Dec. 21, 2015, in the Korean Intellectual Property Office and assigned Serial No. 10-2015-0182710, the entire disclosure of which is hereby incorporated by reference.

TECHNICAL FIELD

Various embodiments relates to an electronic device including a coupling structure.

BACKGROUND

Mobile devices, particularly a portable mobile device such as a notebook computer have a display unit for enabling to obtain information through visual sense and a manipulation unit for manipulating the device. The display unit and the manipulation unit may be mounted in two housings, respectively. By tilting the two housings, the manipulation unit, the display unit, or both units may be converted to a use state in which a user may use or to an idle state for movement and reception.

In the notebook computer, because two housings are connected to a fixed hinge structure, the two housings may not generally be separated. Nowadays, while an individually usable tablet Personal Computer (PC) is widely used, in order to compensate an input function of the tablet PC, a method of detachably attaching the tablet PC to a housing having a manipulation unit is considered.

SUMMARY

To address the above-discussed deficiencies, it is a primary object to provide an electronic device including a coupling structure that can use in various forms by organically connecting two detachable housings.

In accordance with an embodiment of the present disclosure, an electronic device may include a first housing having a first surface and a second surface at a rear surface of the first surface that is opposite from the first surface. In various embodiments, a second housing may be coupled to the first housing, and the second housing may include a third surface, a fourth surface at a rear surface opposite of the third surface, and a side member that encloses space between the third surface and the fourth surface. The first housing may further include a coupling structure on the first surface; the coupling structure connected to a portion of the side member of the second housing, when the second housing is coupled to the first housing. Moreover, the coupling structure may include a recess extended in a first direction along a portion of the side member, when the second housing is coupled to the first housing. A moving member that performs a pivotal movement about a shaft may be extended in the first direction while the second housing is coupled to the first housing. Finally, various embodiments may include a retainer system that enables the second housing to at least partially stay within the moving member at a recess portion, when the second housing is not coupled to the first housing.

An electronic device including a coupling structure, according to various embodiments of the disclosure, may reduce an amount of movement, reduce a frequency of movement, or possibly prevent the electronic device from moving by restricting a coupling structure when two detachable housings are coupled.

An electronic device including a coupling structure, according to various embodiments, may be fixed in a position using a magnet, such that a number of components for assembly of the electronic device may be decreased and, hence, a cost thereof can be reduced.

When an electronic device including a coupling structure according to various embodiments is coupled to a separate cover, the electronic device may be prevented from moving, or a distance of moving or frequency of moving may be reduced, by using a camera deco. The restriction of movement may cause a component number to decrease and thus may reduce a cost of making the electronic device Also, when an electronic device including a coupling structure is coupled to a separate cover using a magnet, according to various embodiments of the disclosure, a movement of the electronic device by be reduced or prevented and therefore, provide a convenience to a user thereof.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
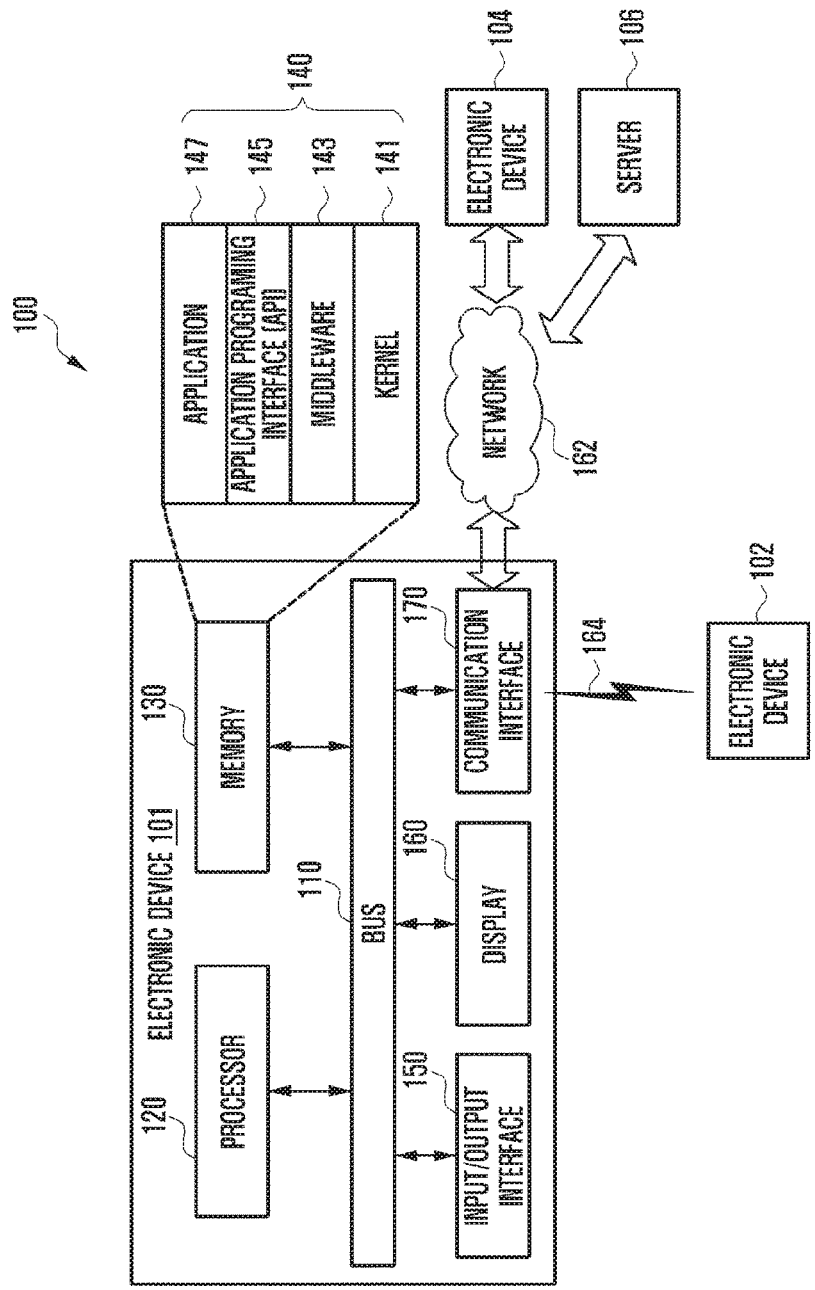
FIG. 1 is a block diagram illustrating an electronic device in a network environment according to various embodiments of the disclosure.

FIGS. 1 through 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, various embodiments of this document will be described in detail with reference to the accompanying drawings. However, it should be understood that technology described in this document is not limited to a specific exemplary embodiment and includes various modifications, equivalents, and/or alternatives of an embodiment of this document. The same reference numbers are used throughout the drawings to refer to the same or like parts.

In this document, an expression such as "have," "may have," "comprise," or "may comprise" indicates existence of a corresponding characteristic (e.g., constituent element such as a numerical value, function, operation, or component) and does not exclude presence of another characteristic.

In this document, an expression such as "A or B", "at least one of A or/and B", or "one or more of A or/and B" may include an entire combination of together listed items. For example, "A or B," "at least one of A and B," or "one or more of A or B" may indicate the entire of (1) a case of including at least one A, (2) a case of including at least one B, and (3) a case of including both at least one A and at least one B.

An expression such as "first" and "second" used in this document may indicate various constituent elements regardless of order and/or importance, is used for distinguishing a constituent element from another constituent element and does not limit corresponding constituent elements. For example, a first user device and a second user device may represent another user device regardless of order and/or importance. For example, a first constituent element may be referred to as a second element without deviating from the scope described in this document, and similarly, a second constituent element may be referred to as a first constituent element.

When it is described that a constituent element (e.g., a first constituent element) is "(operatively or communicatively) coupled with/to" or is "connected to" another constituent element (e.g., a second constituent element), it should be understood that the constituent element may be directly connected to the another constituent element or may be connected to the another constituent element through another constituent element (e.g., a third constituent element). However, when it is described that a constituent element (e.g., a first constituent element) is "directly connected" or is "directly accessed" to another constituent element (e.g., a second constituent element), it may be understood that another constituent element (e.g., a third constituent element) does not exist between the constituent element and the another constituent element.

An expression "configured to" used in this document may be interchangeably used with, for example "suitable for", "having the capacity to", "designed to", "adapted to", "made to", or "capable of" according to a situation. A term "configured to" does not always mean "specifically designed to" in hardware. Alternatively, in any situation, an expression "device configured to" may mean that the device is "capable of" being configured together with another device or components. For example, a "processor configured to perform phrases A, B, and C" may be a generic-purpose processor (e.g., CPU or application processor) that executes an exclusive processor (e.g., an embedded processor) for performing a corresponding operation or at least one software program stored at a memory device to perform a corresponding operation.

Terms used in this document are used for describing a specific embodiment and do not limit a range of another embodiment. When using in a description of this document and the appended claims, a singular expression may include a plurality of expressions unless explicitly differently represented. Unless differently defined, terms used here including a technical or scientific term have the same meaning as that which may be generally understood by a person of common skill in the art. Terms defined in a general dictionary among terms used in this document may be analyzed as the same meaning as or a meaning similar to that in a context of related technology, and unless it is clearly defined in this document, the term is not analyzed as an ideal or excessively formal meaning. In some case, a term defined in this document cannot be analyzed to exclude embodiments of this document.

An electronic device according to various embodiments of this document may include at least one of, for example a smart phone, tablet Personal Computer (tablet PC), mobile phone, video phone, e-book reader, desktop PC, laptop PC, netbook computer, workstation, server, Personal Digital Assistant (PDA), Portable Multimedia Player (PMP), Moving Picture Experts Group layer-3 (MP3) player, mobile medical device, camera, and wearable device. According to various embodiments, a wearable device may include at least one of an accessory type device (e.g., watch, ring, bracelet, ankle bracelet, necklace, glasses, contact lens), head-mounted-device (HMD), textile or clothing integral type device (e.g., electronic clothing), body attachment type device (e.g., skin pad or tattoo), and bio implanted type device (e.g., implantable circuit).

In an embodiment, the electronic device may be a home appliance. The home appliance may include at least one of, for example a television, Digital Video Disk (DVD) player, audio device, refrigerator, air-conditioner, cleaner, oven, microwave oven, washing machine, air cleaner, set-top box, home automation control panel, security control panel, television box (e.g., Samsung HomeSync™, AppleTV™, or Google TV™), game console (e.g., Xbox™, PlayStation™), electronic dictionary, electronic key, camcorder, and electronic frame.

In another embodiment, an electronic device may include at least one of various medical devices (e.g., various portable medical measurement devices (blood sugar measurement device, heartbeat measurement device, blood pressure measurement device, or body temperature measurement device), Magnetic Resonance Angiography (MRA) device, Magnetic Resonance Imaging (MM) device, Computed Tomography (CT) device, scanning machine, and ultrasonic wave device), navigation device, Global Navigation Satellite System (GNSS), Event Data Recorder (EDR), Flight Data Recorder (FDR), vehicle infotainment device, ship electronic equipment (e.g., ship navigation device, gyro compass), avionics, security device, vehicle head unit, industrial or home robot, automatic teller's machine (ATM) of a financial institution, point of sales (POS) of store, and Internet of things (e.g., bulb, various sensors, electricity or gas meter, sprinkler, fire alarm, thermostat, street light, toaster, exercise mechanism, hot water tank, heater, boiler).

According to an embodiment, the electronic device may include at least one of a portion of furniture or a building/structure, electronic board, electronic signature receiving device, projector, and various measurement devices (e.g., water supply, electricity, gas, or electric wave measurement device). In various embodiments, the electronic device may be a combination of one or more of the foregoing various devices. An electronic device according to an embodiment may be a flexible electronic device. Further, the electronic device according to an exemplary embodiment of this document is not limited to the foregoing devices and may include a new electronic device according to technology development.

Hereinafter, an electronic device according various embodiments will be described with reference to the accompanying drawings. In this document, a term 'user' may indicate a person using an electronic device or a device (e.g., artificial intelligence electronic device) using an electronic device.

FIG. 1 is a block diagram illustrating an electronic device 101 in a network environment 100 according to various embodiments.

With reference to FIG. 1, in various embodiments, the electronic device 101 is disposed in a network environment 100. The electronic device 101 may include a bus 110, processor 120, memory 130, input and output interface 150, display 160, and communication interface 170. In various embodiments, the electronic device 101 may omit at least one of a number of constituent elements or may additionally have another constituent element.

The bus 110 may connect, for example constituent elements 110-170 and may include a circuit that transfers communication (e.g., control message and/or data) between constituent elements.

The processor 120 may include at least one of a Central Processing Unit (CPU), Application Processor (AP), and Communication Processor (CP). The processor 120 may execute, for example, a calculation or data processing operation of the control and/or communication of at least one another constituent element of the electronic device 101.

The memory 130 may include a volatile memory and/or a nonvolatile memory. The memory 130 may store, for example an instruction or data related to at least one other element of the electronic device 101. According to an embodiment, the memory 130 may store software and/or a program 140. The program 140 may include, for example kernel 141, middleware 143, an Application Programming Interface (API) 145, and/or an application program (or "application") 147. At least a portion of the kernel 141, the middleware 143, and the API 145 may be referred to as an Operating System (OS).

The kernel 141 may control or manage, for example system resources (e.g., the bus 110, the processor 120, or the memory 130) used for executing an operation or a function implemented in other programs (e.g., the middleware 143, the API 145, or the application program 147). Further, the kernel 141 may provide an interface that may control or manage system resources by accessing from the middleware 143, the API 145, and the application 147 to an individual element of the electronic device 101.

The middleware 143 may perform an intermediary function of transmitting and receiving data by enabling the API 145 or the application 147 to communicate with the kernel 141.

Further, the middleware 143 may process at least one work request received from the application program 147 according to a priority. For example, the middleware 143 may give a priority that can use a system resource (e.g., the bus 110, the processor 120, or the memory 130) of the electronic device 101 to at least one of the application programs 147. For example, the middleware 143 may process the at least one work request according to a priority given to the at least one application program 147, thereby performing scheduling or load balancing of the at least one work request.

The API 145 is an interface that enables the application 147 to control a function in which the kernel 141 or the middleware 143 provides and may include, for example at least one interface or function (e.g., instruction) for a file control, window control, image processing, or text control.

The input and output interface 150 may perform a function of an interface that can transfer an instruction or data input by, for example a user or other external devices to other element(s) of the electronic device 101. Further, the input and output interface 150 may output an instruction or data received from other element(s) of the electronic device 101 to a user or other external devices.

The display 160 may include, for example a Liquid Crystal Display (LCD), Light Emitting Diode (LED) display, Organic Light Emitting Diode (OLED) display, or Microelectromechanical Systems (MEMS) display, or electronic paper display. The display 160 may display, for example various contents (e.g., text, image, video, icon, or symbol) to a user. The display 160 may include a touch screen and may receive, for example a touch, gesture, proximity, or hovering input using a portion of a user body or an electronic pen.

The communication interface 170 may set, for example communication between the electronic device 101 and an external device (e.g., a first external electronic device 102, second external electronic device 104, or server 106). For example, the communication interface 170 may be connected to a network 162 through wireless communication or wire communication to communicate with an external device (e.g., the second external electronic device 104 or the server 106).

Wireless communication may use at least one of, for example Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM) as a cellular communication protocol. Further, wireless communication may include, for example short range communication 164. The short range communication 164 may include at least one of, for example Wireless Fidelity (WiFi), Bluetooth®, Near Field Communication (NFC), and Global Navigation Satellite System (GNSS). The GNSS may include at least one of, for example a Global Positioning System (GPS), Global Navigation Satellite System)(Glonass®, Beidou® Navigation Satellite System (hereinafter "Beidou") or Galileo, and European global satellite-based navigation system according to a use region or a bandwidth. Hereinafter, in this document, "GPS" and "GNSS" may be interchangeably used. The wire communication may include at least one of, for example a Universal Serial Bus (USB), a High Definition Multimedia Interface (HDMI), Recommended Standard 232 (RS-232), and a Plain Old Telephone Service (POTS). The network 162 may include a telecommunication network, for example at least one of a computer network (e.g., LAN or WAN), Internet, and a telephone network.

The first and second external electronic devices 102 and 104 each may be a device of the same kind as or a kind different from that of the electronic device 101. According to an exemplary embodiment, the server 106 may include a group of at least one server. According to various exemplary embodiments, the entire or some of operations executed in the electronic device 101 may be executed in another one electronic device or a plurality of electronic devices (e.g., the electronic devices 102 and 104 or the server 106). According to an embodiment, when the electronic device 101 should perform any function or service automatically or by a request, the electronic device 101 may request at least a partial function related thereto additionally or instead of executing a function or a service itself to another device (e.g., the electronic devices 102 and 104 or the server 106). Another electronic device (e.g., the electronic devices 102 and 104, or server 106) may execute a requested function or an additional function and transfer a result thereof to the electronic device 101. The electronic device 101 may provide a requested function or service by processing a received result or additionally processing. For this purpose, for example cloud computing, distributed computing, or client-server computing technology may be used.

Figure 2:
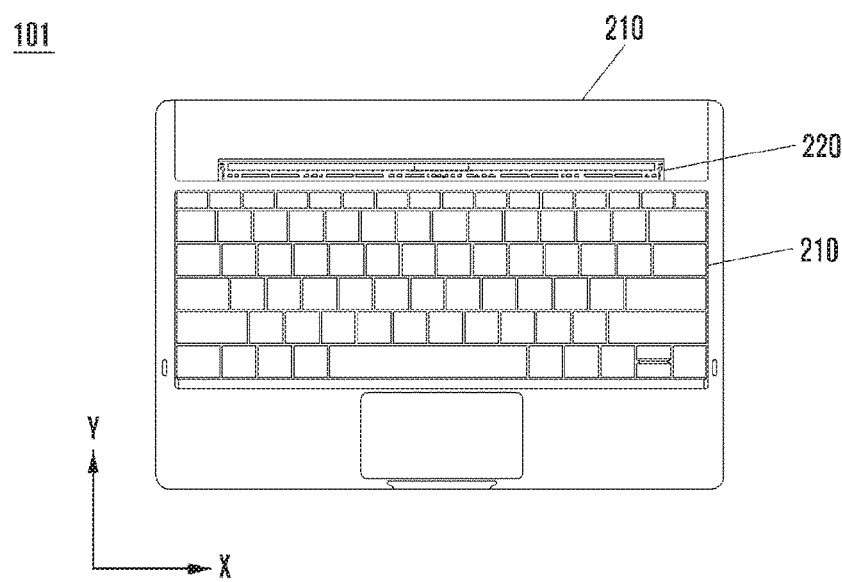
FIG. 2 is a perspective view illustrating an electronic device according to various embodiments.
Figure 2:
Figure 2:
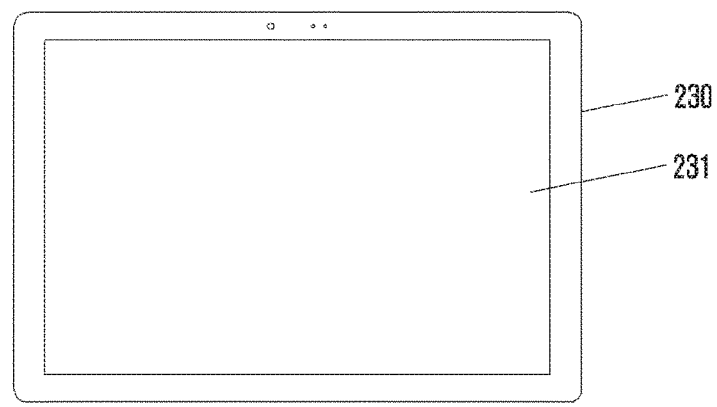

FIG. 2 is a perspective view illustrating an electronic device 101 according to various embodiments. The electronic device 101 may be a portable computer or a tablet Personal Computer (PC). The electronic device 101 may include a first housing 200 and a second housing 230.

According to various embodiments, the first housing 200 may include an input module 210 and a coupling structure 220. The input module 210 may be, for example the input and output interface 150. The input module 210 may include at least one of a keyboard module, joystick, touch pad, and pointing device. At one side end of the first housing 200 based on the input module 210, the coupling structure 220 may be disposed.

According to various embodiments, the first housing 200 may be a rectangle in which the width side is longer than the length side. When the length side of the first housing 200 is referred to as a y-axis direction and when the width side of the first housing 200 is referred to as an x-axis direction, the coupling structure 220 may be disposed in a row in a width direction (e.g., x-axis direction) of the first housing 200. At the first housing 200 in which a keyboard of the input module 210 is disposed, the coupling structure 220 may be disposed at an upper end portion of the keyboard. When a surface in which the input module 210 is disposed is referred to as an upper surface of the first housing 200, the coupling structure 220 may be disposed at an upper surface of the first housing 200. The first housing 200 may be a plate type, and a surface opposite to an upper surface in which a keyboard is disposed may be a lower surface. The first housing 200 may include a side member that encloses an upper surface and a lower surface. The coupling structure 220 may be disposed in a width direction along a portion of the side member.

According to various embodiments, the first housing 200 may include an interface (e.g., the communication interface 170) that can communicate with the second housing 230. The first housing 200 may include a Flexible Printed Circuit Board (FPCB) connected to the input module 210 to receive an input signal. The first housing 200 may be a docking station that functions as an auxiliary input device and/or a power supply device and/or a charge station of the electronic device 100.

According to various embodiments, the coupling structure 220 may include at least one pogo structure (e.g., a pogo pin structure), at least one magnet, at least one electrical connection member, and at least one moving member. The at least one electrical connection member may include an electrical connector that may electrically connect the first housing 200 and the second housing 230. The electrical connector may include at least one movable conductive pin.

According to various embodiments, the first housing 200 may include at least one of a keyboard, pointing device, joystick, and touch pad and at least one of a charge circuit (e.g., Power Management Integrated Circuit (PMIC)) and a battery.

According to various embodiments, the first housing 200 may include at least one magnet, at least one moving member, and a communication interface. When the first housing 200 includes a charge circuit and a battery, the first housing 200 may be connected to the second housing 230 through at least one pogo structure (e.g., a pogo pin structure) or the coupling structure 220 (e.g., at least one magnet, at least one moving member) having no electrical connection member. In this case, the first housing 200 and the second housing 230 may communicate using a communication interface (e.g., Long-Term Evolution (LTE), LTE Advance (LTE-A), Code Division Multiple Access (CDMA), Wideband CDMA (WCDMA), Universal Mobile Telecommunications System (UMTS), Wireless Broadband (WiBro), Global System for Mobile Communications (GSM), Wireless Fidelity (WiFi), Bluetooth®, Near Field Communication (NFC), or Global Navigation Satellite System (GNSS)) included in each housing.

According to various embodiments, the coupling structure 220 may include a recess, moving member, and retainer system. When the second housing 230 is coupled to the first housing 200, at least a portion of a side member of the second housing 230 may be received at the recess, and the recess may be disposed in a width direction along a portion of the side member of the first housing 200. While the second housing 230 is coupled to the first housing 200, a moving member may provide a pivotal movement to the second housing 230. The retainer system may maintain a posture such that at least one pogo structure does not float.

According to various embodiments, the first housing 200 may be connected to a cover (not shown) that may cover at least a portion of the second housing 230.

According to various embodiments, the second housing 230 may include a display 231 (e.g., the display 160) that display an image. The display 231 may be, for example a liquid crystal device and a flat display device using an organic light emitting element. The display 231 may include a touch panel. Although not shown in the drawing, the second housing 230 may include a speaker (e.g., the input and output interface 150) that outputs sound. The second housing 230 may be a tablet PC. The second housing 230 may be a plate type. In the second housing 230, a surface in which the display 231 is disposed may be referred to as an upper surface and a surface opposite to the upper surface in which the display 231 is disposed may be referred to as a lower surface. The second housing 230 may include a side member that encloses an upper surface and a lower surface. The second housing 230 may include a coupling structure (not shown) in at least a portion of a side member. When the first housing 200 and the second housing 230 are coupled, a coupling structure (not shown) of the second housing 230 and a coupling structure (not shown) of the first housing 200 may be engaged. The second housing 230 may include at least one of the bus 110, the processor 120, the memory 130, the input and output interface 150, the display 160, and the communication interface 170 of FIG. 1. The second housing 230 may include at least one of a camera module, a charge circuit (e.g., PMIC), and a battery.

Figure 3:
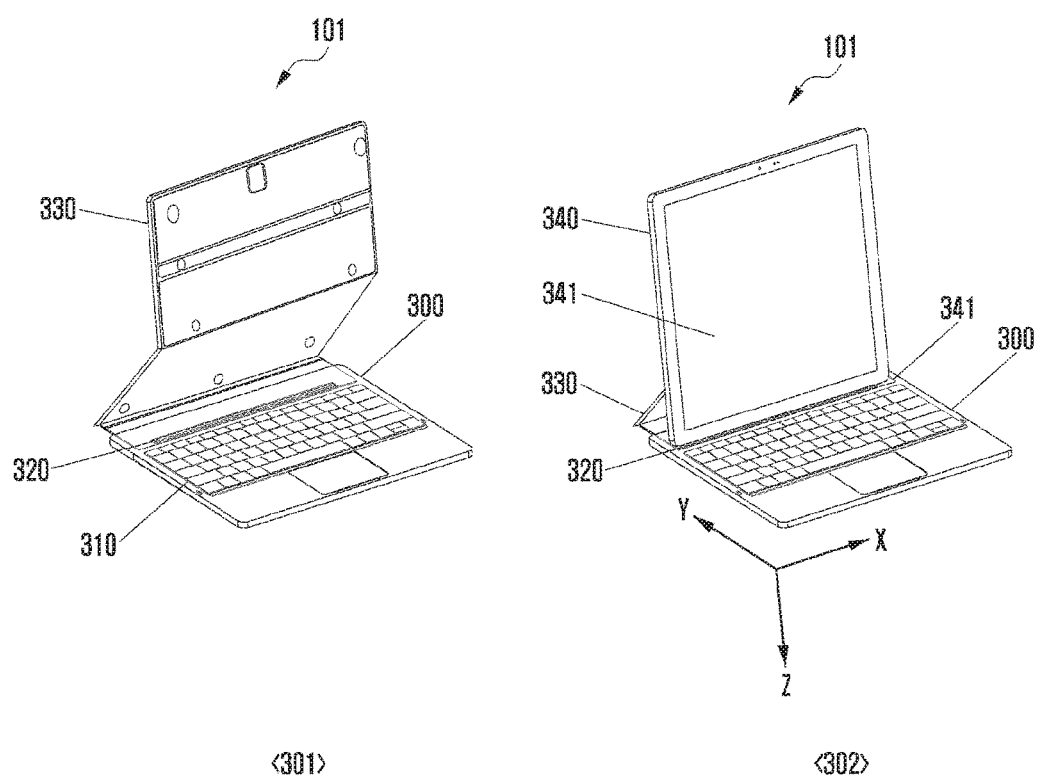
FIG. 3 is a perspective view illustrating an electronic device according to various embodiments.

FIG. 3 is a perspective view illustrating the electronic device 101 according to various embodiments.

A reference numeral 301 illustrates a perspective view of a first housing 300 when a second housing 340 is not coupled to the first housing 300 according to various embodiments.

According to various embodiments, the first housing 300 may include an input module 310 (e.g., the input module 210), coupling structure 320 (e.g., the coupling structure 220), and cover 330.

In the second housing 340 (e.g., the second housing 230), a surface in which a display 341 is disposed may be referred to as an upper surface and a surface opposite to the upper surface in which the display 341 is disposed may be referred to a lower surface. The second housing 340 may include a side member that encloses an upper surface and a lower surface.

A cover 330 may cover at least a portion of the second housing 340. The cover 330 may include a flexible structure whose at least a portion may bend. The cover 330 may include a polyurethane material to provide a flexible structure.

A reference numeral 302 illustrates a perspective view of the electronic device 101 when the second housing 340 is coupled to the first housing 300 according to various embodiments.

The second housing 340 may be coupled to at least a portion of a side member and the coupling structure 320 of the first housing 300. The second housing 340 may be coupled to the first housing 300 in a vertical direction of an upper surface of the first housing 300. The first housing 300 may be a plate type, and a surface in which the input module 310 is disposed may be an upper surface, and a surface opposite to the upper surface may be a lower surface. The second housing 340 may be coupled to the first housing 300 vertical to the coupling structure 320. The second housing 340 may be coupled to the first housing 300 in a z-axis direction of FIG. 3.

Figure 4:
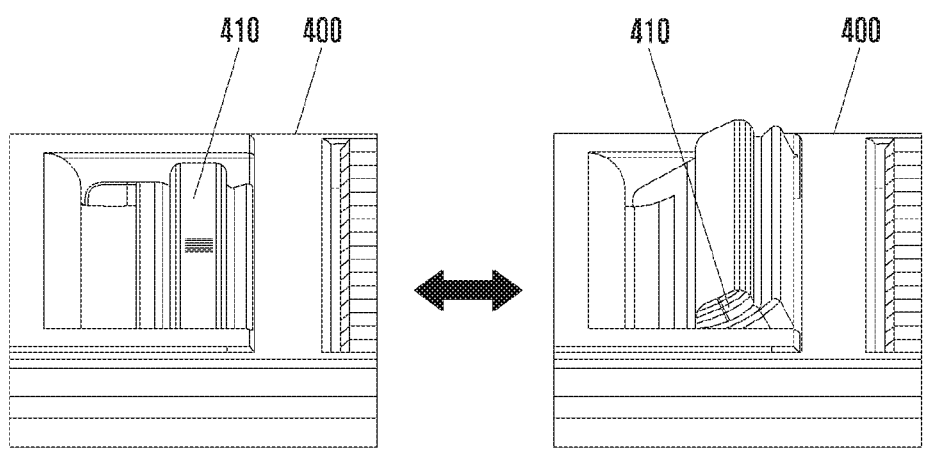
FIG. 4 is a diagram illustrating a coupling structure according to various embodiments.

FIG. 4 is a diagram illustrating a coupling structure 400 according to various embodiments.

With reference to FIGS. 2 to 4, the coupling structure 400 may be the same as, for example the coupling structure 220 of FIG. 2 and the coupling structure 320 of FIG. 3.

The second housing 340 may be coupled to at least a portion of a side member and the coupling structure 400 (e.g., the coupling structure 320 of FIG. 3) of the first housing 300. In the coupling structure 400, a retainer system 410 may be connected to a moving member such that the first housing 300 forms various support angles.

Figure 5A:
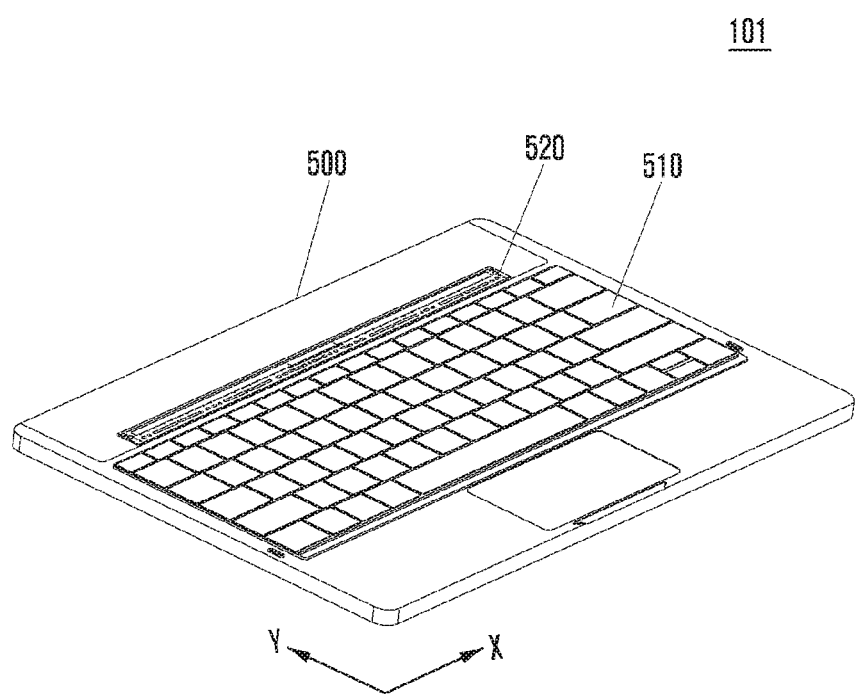
FIGS. 5A to 5C are perspective views illustrating an electronic device according to various embodiments.
Figure 5B:
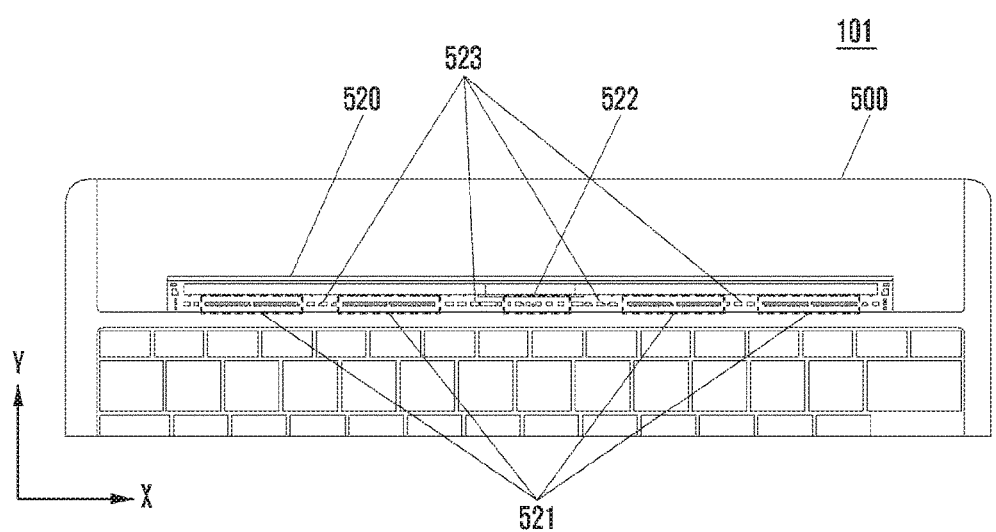
Figure 5C:
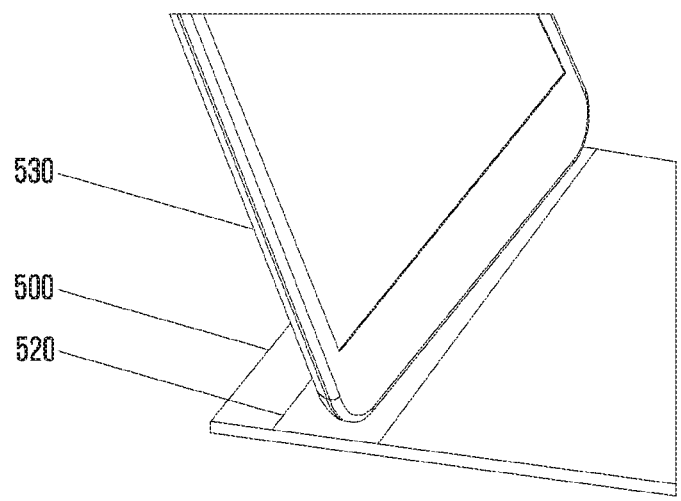

FIGS. 5A to 5C are perspective views illustrating an electronic device 101 according to various embodiments.

As shown in FIG. 5A, a first housing 500 (e.g., the first housing 200) of the electronic device 101 may include an input module 510 (e.g., the input module 210) and a coupling structure 520 (e.g., the coupling structure 220).

According to various embodiments, the first housing 500 (e.g., the first housing 200) may be a rectangle in which the width side is longer than the length side. When the length side of the first housing 500 (e.g., the first housing 200) is referred to as an y-axis direction and when the width side of the first housing 500 (e.g., the first housing 200) is referred to as an x-axis direction, the coupling structure 520 (e.g., the coupling structure 220) may be disposed in a row in a width direction (e.g., an x-axis direction) of the first housing 500 (e.g., the first housing 200). At the first housing 500 (e.g., the first housing 200) in which a keyboard of the input modules 510 (e.g., the input module 210) is disposed, the coupling structure 520 (e.g., the coupling structure 220) may be disposed at an upper end portion of the keyboard. When a surface in which the input module 510 (e.g., the input module 210) is disposed is referred to as an upper surface of the first housing 500 (e.g., the first housing 200), the coupling structure 520 (e.g., the coupling structure 220) may be disposed at an upper surface of the first housing 500 (e.g., the first housing 200). The first housing 500 (e.g., the first housing 200) may be a plate type, and a surface opposite to an upper surface in which the keyboard is disposed may be referred to as a lower surface. The first housing 500 (e.g., the first housing 200) may include a side member that encloses an upper surface and a lower surface. The coupling structure 520 (e.g., the coupling structure 220) may be disposed in a width direction along a portion of a side member.

As shown in FIGS. 5B and 5C, according to various embodiments, the coupling structure 520 (e.g., the coupling structure 220) may include at least one of at least one magnet 521, at least one pogo structure 522, at least one electrical connection member 523, and at least one moving member (not shown). The at least one electrical connection member 523 may include an electrical connector that can electrically connect the first housing 500 (e.g., the first housing 200) and a second housing 530 of FIG. 5C (e.g., the second housing 230 of FIG. 2). The electrical connector may include at least one movable conductive pin.

According to various embodiments, the coupling structure 520 (e.g., the coupling structure 220) may include a recess 524, a moving member (not shown), and retainer systems 522 and 523. When the second housing 530 of FIG. 5C (e.g., the second housing 230 of FIG. 2) is coupled to the first housing 500 (e.g., the first housing 200), at least a portion of a side member of the second housing 530 (e.g., the second housing 230) may be received at the recess 524, and the recess 524 may be disposed in a width direction along a portion of a side member of the first housing 500 (e.g., the first housing 200). While the second housing 530 (e.g., the second housing 230) is coupled to the first housing 500 (e.g., the first housing 200), the moving member (not shown) may provide a pivotal movement to the second housing 530 (e.g., the second housing 230). The retainer systems 522 and 523 may maintain a posture such that at least one pogo structure 522 does not float using at least one magnet 521.

According to various embodiments, the second housing 530 (e.g., the second housing 230) may be coupled to at least a portion of the side member and the coupling structure 520 (e.g., the coupling structure 220) of the first housing 500 (e.g., the first housing 200). The second housing 530 (e.g., the second housing 230) may be coupled to the first housing 500 (e.g., the first housing 200 in a vertical direction of an upper surface of the first housing 500 (e.g., the first housing 200). The first housing 500 (e.g., the first housing 200) may be a plate type, and a surface in which the input module 510 (e.g., the input module 210) is disposed may be an upper surface, and a surface opposite to the upper surface may be a lower surface. The second housing 530 (e.g., the second housing 230) may be coupled to the first housing 500 (e.g., the first housing 200) vertical to the coupling structure 520 (e.g., the coupling structure 220). The coupling structure 520 (e.g., the coupling structure 220) may be coupled to at least one magnet (not shown) included in the second housing 530 (e.g., the second housing 230) using at least one magnet 521. The at least one magnet 521 may be each disposed to have the same polarity in the same direction. At least one magnet (not shown) included in the second housing 530 (e.g., the second housing 230) may be each disposed to have the same polarity in the same direction. The polarity of at least one magnet 521 and the polarity of at least one magnet (not shown) included in the second housing 530 (e.g., the second housing 230) may be opposite. For example, when the polarity of at least one magnet 521 is an N-pole, the polarity of at least one magnet (not shown) included in the second housing 530 (e.g., the second housing 230) may be an S-pole.

Figure 6:
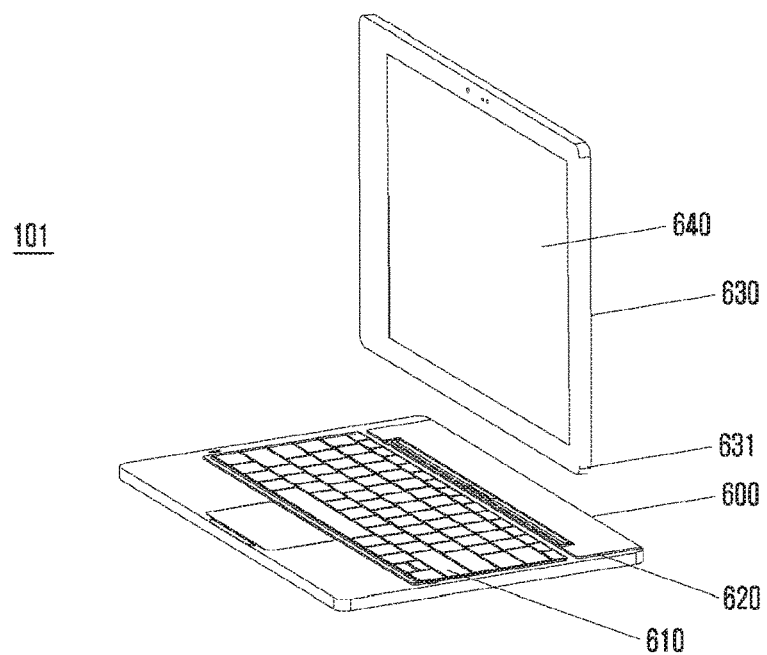
FIG. 6 is a perspective view illustrating a state before a first housing and a second housing of an electronic device are coupled, according to various embodiments.
Figure 6:
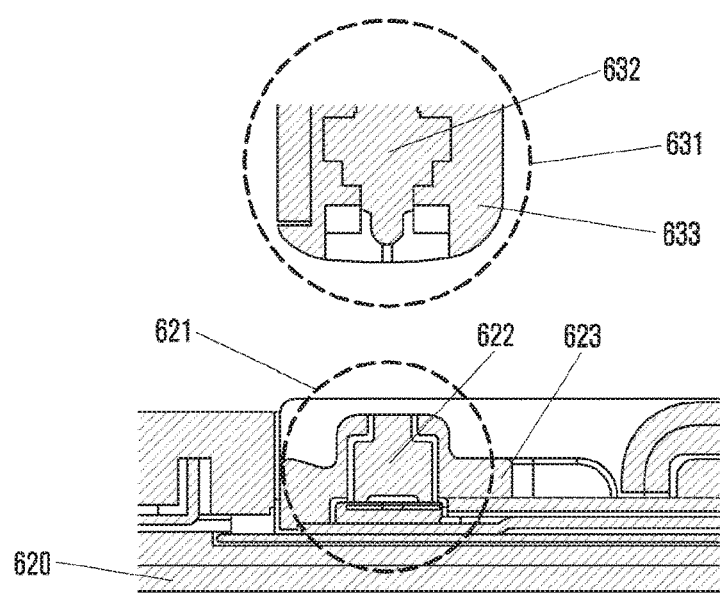

FIG. 6 is a perspective view illustrating a state before a first housing 600 and a second housing 630 of the electronic device 101 are coupled according to various embodiments.

Figure 7:
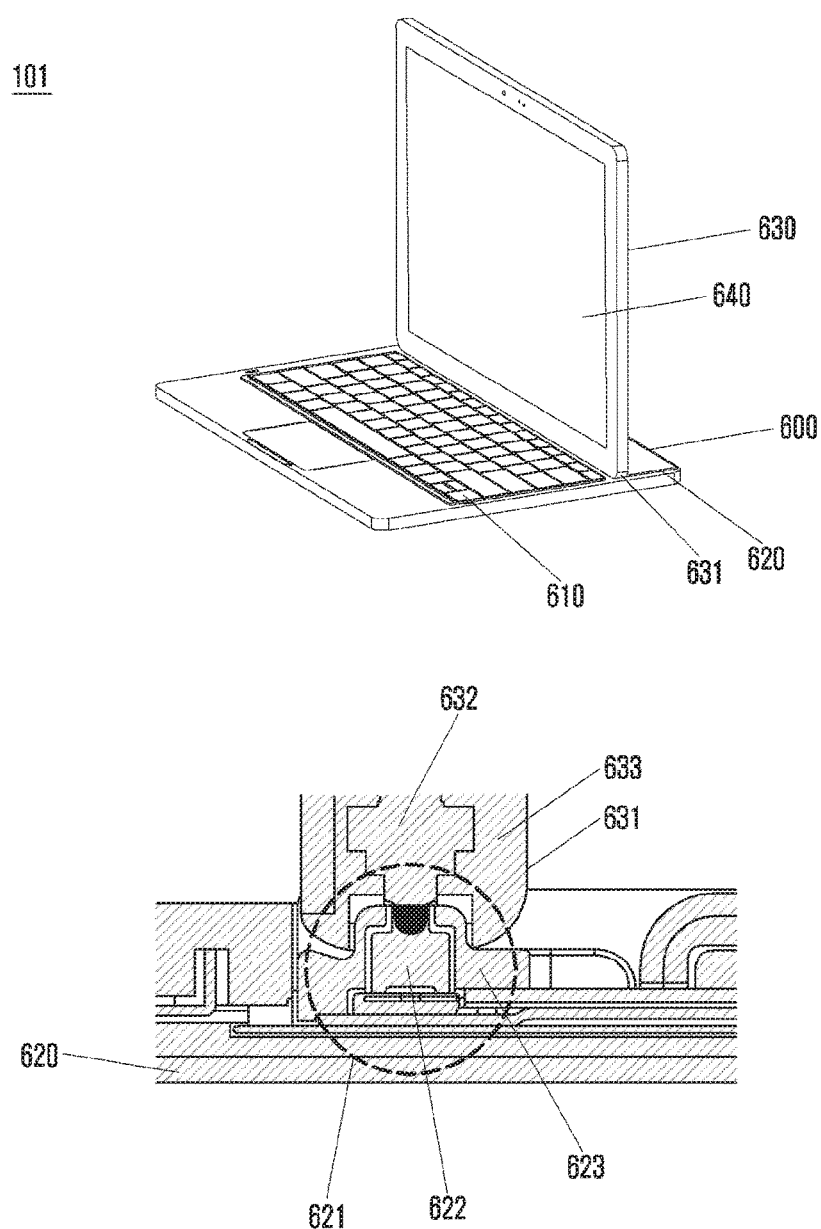
FIG. 7 is a perspective view illustrating a state after a first housing and a second housing of an electronic device are coupled according to various embodiments.

FIG. 7 is a perspective view illustrating a state after the first housing 600 and the second housing 630 of the electronic device 101 are coupled according to various embodiments.

With reference to FIGS. 6 and 7, the first housing 600 (e.g., the first housing 200) may include an input module 610 (e.g., the input module 210) and a first coupling structure 620 (e.g., the coupling structure 220).

According to various embodiments, the second housing 630 (e.g., the second housing 230) may include a display 640 (e.g., the display 231) that displays an image. The second housing 630 may be a plate type. At the second housing 630, a surface in which the display 640 is disposed may be referred to as an upper surface and a surface opposite to the upper surface in which the display 640 is disposed may be referred to as a lower surface. The second housing 630 may include a side member that encloses an upper surface and a lower surface. The second housing 630 may include a second coupling structure 631 in at least a portion of a side member. When the first housing 600 and the second housing 630 are coupled, the second coupling structure 631 and the first coupling structure 620 may be coupled.

According to various embodiments, the first coupling structure 620 may include a retainer system 621. The retainer system 621 may have a pogo structure. The pogo structure may include a socket 622 and a protrusion member 623. The protrusion member 623 may include a socket 622 therein. The socket 622 may be coupled to the second coupling structure 631 included in at least a portion of a side member of the second housing 630.

According to various embodiments, the second coupling structure 631 may include a pogo pin member 632 and a recessed member 633. The pogo pin member 632 may be included in the recessed member 633. The recessed member 633 may enable at least a portion (e.g., a plunger) of the pogo pin member 632 to be exposed to the outside.

According to various embodiments, when the first housing 600 and the second housing 630 are coupled, the pogo pin member 632 whose at least a portion (e.g., a plunger) is exposed to the outside may be coupled to the socket 622. When the first housing 600 and the second housing 630 are coupled, a portion of the pogo pin member 632 may be inserted into the socket 622. When the first housing 600 and the second housing 630 are coupled, the protrusion member 623 may be coupled to the recessed member 633. When the first housing 600 and the second housing 630 are coupled, the protrusion member 623 may be inserted into the recessed member 633.

Figure 8:
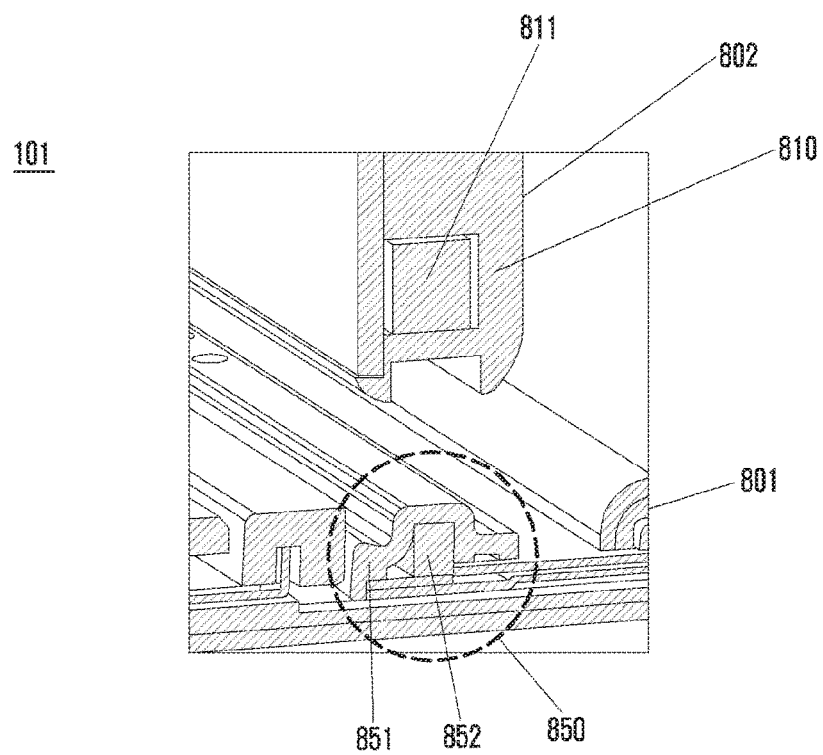
FIG. 8 is a perspective view illustrating a magnet disposition of a first housing and a second housing of an electronic device according to various embodiments.
Figure 8:
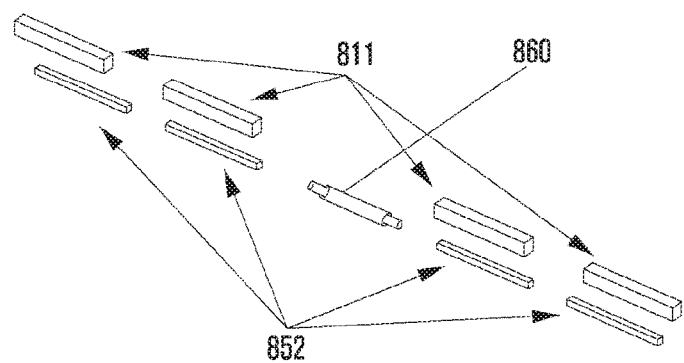

FIG. 8 is a perspective view illustrating a magnet disposition of a first housing 801 and a second housing 802 of the electronic device 101 according to various embodiments.

According to various embodiments, the electronic device 101 may include a first housing 801 (e.g., the first housing 200) and the second housing 802 (e.g., the second housing 230).

According to various embodiments, the first housing 801 may include a first coupling structure 850 (e.g., the first coupling structure 620). The second housing 802 may include a second coupling structure 810 (e.g., the second coupling structure 631).

According to various embodiments, the first coupling structure 850 is extended in a major axis direction of the first housing 801 and may include an extended protrusion member 851 and at least one magnet 852. The at least one magnet 852 may be included within the protrusion member 851.

According to various embodiments, the second coupling structure 810 may include a recessed member (e.g., the recessed member 633) extended in at least a partial direction of a side member of the second housing 802.

According to various embodiments, the second coupling structure 810 may include at least one magnet 811 within a recessed member (e.g., the recessed member 633).

According to various embodiments, at least one magnet 852 of the first coupling structure 850 may be each disposed to have the same polarity in the same direction. At least one magnet 811 included in the second coupling structure 810 may be each disposed to have the same polarity in the same direction.

According to various embodiments, the polarity of at least one magnet 852 of the first coupling structure 850 and the polarity of at least one magnet 811 included in the second coupling structure 810 may be opposite. For example, when the polarity of at least one magnet 852 of the first coupling structure 850 is an N-pole, the polarity of at least one magnet 811 included in the second coupling structure 810 may be an S-pole.

According to various embodiments, the first coupling structure 850 may include a moving member connected to the protrusion member 851, and when the second housing 802 is not coupled to the first housing 801, in order to prevent a floating or moving phenomenon, a lower portion of the protrusion member 851 may include a magnetic coupling member of a metal material that may be coupled to at least one magnet 852 of the first coupling structure 850.

According to various embodiments, a magnetic force between at least one magnet 852 of the first coupling structure 850 and at least one magnet 811 included in the second coupling structure 810 may be greater than that between at least one magnet 852 of the first coupling structure 850 and a magnetic coupling member of a metal material. For example, when a magnetic force between at least one magnet 852 of the first coupling structure 850 and a magnetic coupling member of a metal material is 1200G, a magnetic force between at least one magnet 852 of the first coupling structure 850 and at least one magnet 811 included in the second coupling structure 810 may be 2400G. The reason why a magnetic force between at least one magnet 852 of the first coupling structure 850 and at least one magnet 811 included in the second coupling structure 810 is greater than that between at least one magnet 852 of the first coupling structure 850 and a magnetic coupling member of a metal material is to enable the second housing 802 to move in various angles when the first housing 801 and the second housing 802 are coupled.

At least one pogo structure 860 may be disposed at the center of the first coupling structure 850, and at least one magnet 852 may be disposed to correspond to at least one magnet 811 included in the second coupling structure 810 based on at least one pogo structure 860.

Figure 9:
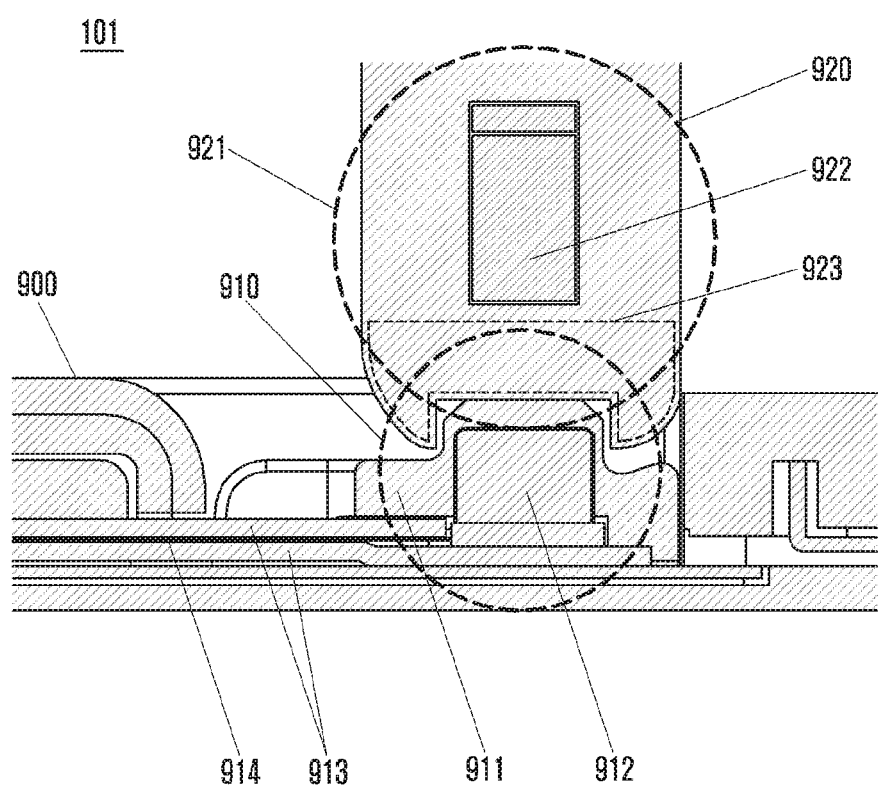
FIG. 9 is a cross-sectional view illustrating coupling of a first housing and a second housing of an electronic device according to various embodiments.

FIG. 9 is a cross-sectional view illustrating a coupling state of a first housing 900 and a second housing 920 of the electronic device 101 according to various embodiments.

According to various embodiments, the electronic device 101 may include the first housing 900 (e.g., the first housing 200) and the second housing 920 (e.g., the second housing 230).

According to various embodiments, the first housing 900 may include a first coupling structure 910 (e.g., the first coupling structure 620) and a moving member 913. The second housing 920 may include a second coupling structure 921 (e.g., the second coupling structure 631).

According to various embodiments, the first coupling structure 910 is extended in a major axis direction of the first housing 900 and may include an extended protrusion member 911 and at least one magnet 912. The at least one magnet 912 may be included within the protrusion member 911.

According to various embodiments, the second coupling structure 921 may include a recessed member 923 extended in at least a partial direction of a side member of the second housing 920. The second coupling structure 921 may include at least one magnet 922 therein.

According to various embodiments, at least one magnet 912 of the first coupling structure 910 may be each disposed to have the same polarity in the same direction. The at least one magnet 922 included in the second coupling structure 921 may be each disposed to have the same polarity in the same direction.

According to various embodiments, when the second housing 920 moves with the first housing 900 and the second housing 920 coupled, the first coupling structure 910 and the moving member 913 may be connected to provide a pivotal movement to the second housing 920. At least one moving member 913 may exist and may be made of polyurethane of a flexible material to provide a pivotal movement to the second housing 920. A Flexible Printed Circuit Board (FPCB) 914 may be disposed between at least one moving members 913.

According to various embodiments, the first coupling structure 910 may include the moving member 913 connected to the protrusion member 911, and when the second housing 920 is not coupled to the first housing 900, in order to prevent a floating or moving phenomenon, a lower portion of the protrusion member 911 may include a magnetic coupling member of a metal material that may be coupled to at least one magnet 912.

Figure 10A:
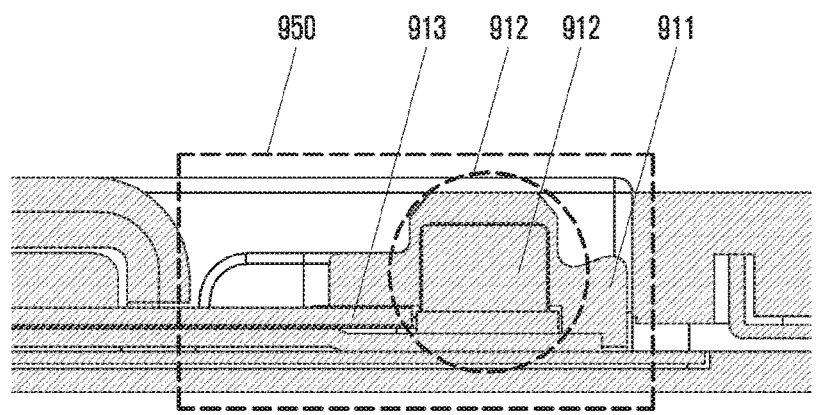
FIGS. 10A and 10B are diagrams illustrating a movement of a first coupling structure according to various embodiments.
Figure 10B:
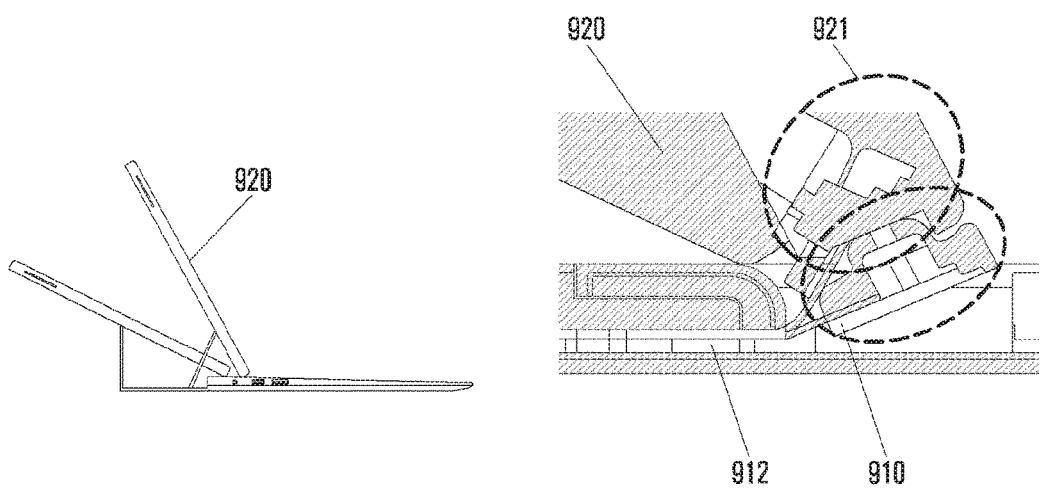

FIGS. 10A and 10B are diagrams illustrating a movement of the first coupling structure 910 according to various embodiments.

With reference to FIGS. 9, 10A, and 10B, when the first coupling structure 910 is not coupled to the second housing 920, the first coupling structure 910 may be coupled with a magnetic force to a magnetic coupling member of a metal material disposed at a lower portion of the first coupling structure 910 using at least one magnet 912 included within the protrusion member 911 of the first coupling structure 910.

When the first coupling structure 910 and the second housing 920 are coupled and when the second housing 920 together with the coupled first coupling structure 910 moves in various angles, at least one magnet 912 included within the protrusion member 911 of the first coupling structure 910 may be separated from a magnetic coupling member of a metal material disposed at a lower portion of the first coupling structure 910. When the first coupling structure 910 and the second housing 920 are coupled and when the second housing 920 together with the coupled first coupling structure 910 moves in various angles, the moving member 913 connected to the first coupling structure 910 may provide a pivotal movement to the second housing 920.

Figure 11:
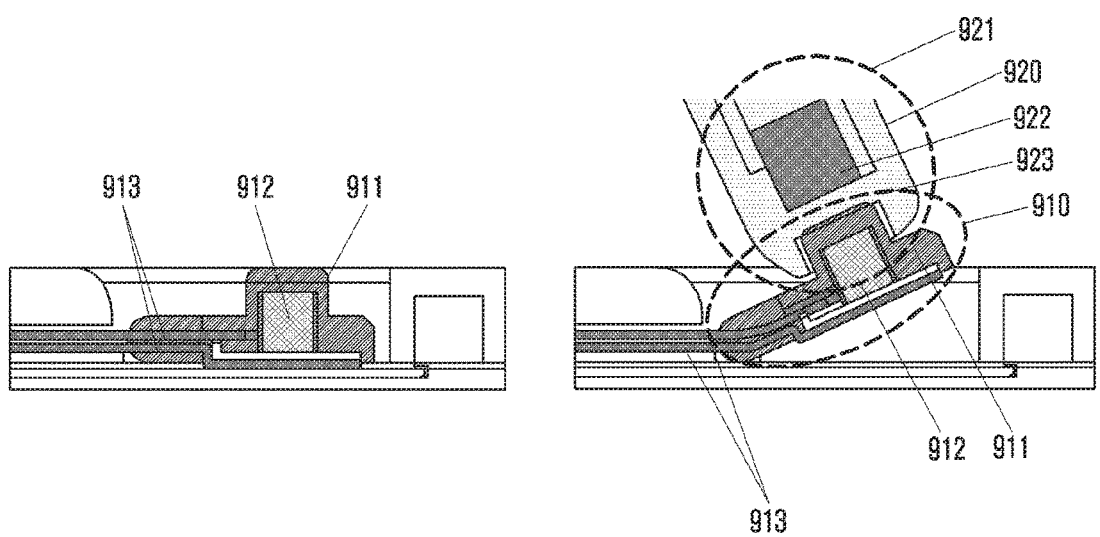
FIG. 11 is a diagram illustrating a movement of a first coupling structure according to various embodiments.

FIG. 11 is a diagram illustrating a movement of the first coupling structure 910 according to various embodiments.

When the first coupling structure 910 and the second housing 920 are coupled and when the second housing 920 together with the coupled first coupling structure 910 moves in various angles, at least one magnet 912 included within the protrusion member 911 of the first coupling structure 910 may be separated from a magnetic coupling member of a metal material disposed at a lower portion of the first coupling structure 910. When the first coupling structure 910 and the second housing 920 are coupled and when the second housing 920 together with the coupled first coupling structure 910 moves in various angles, the moving member 913 connected to the first coupling structure 910 may provide a pivotal movement to the second housing 920.

Figure 12:
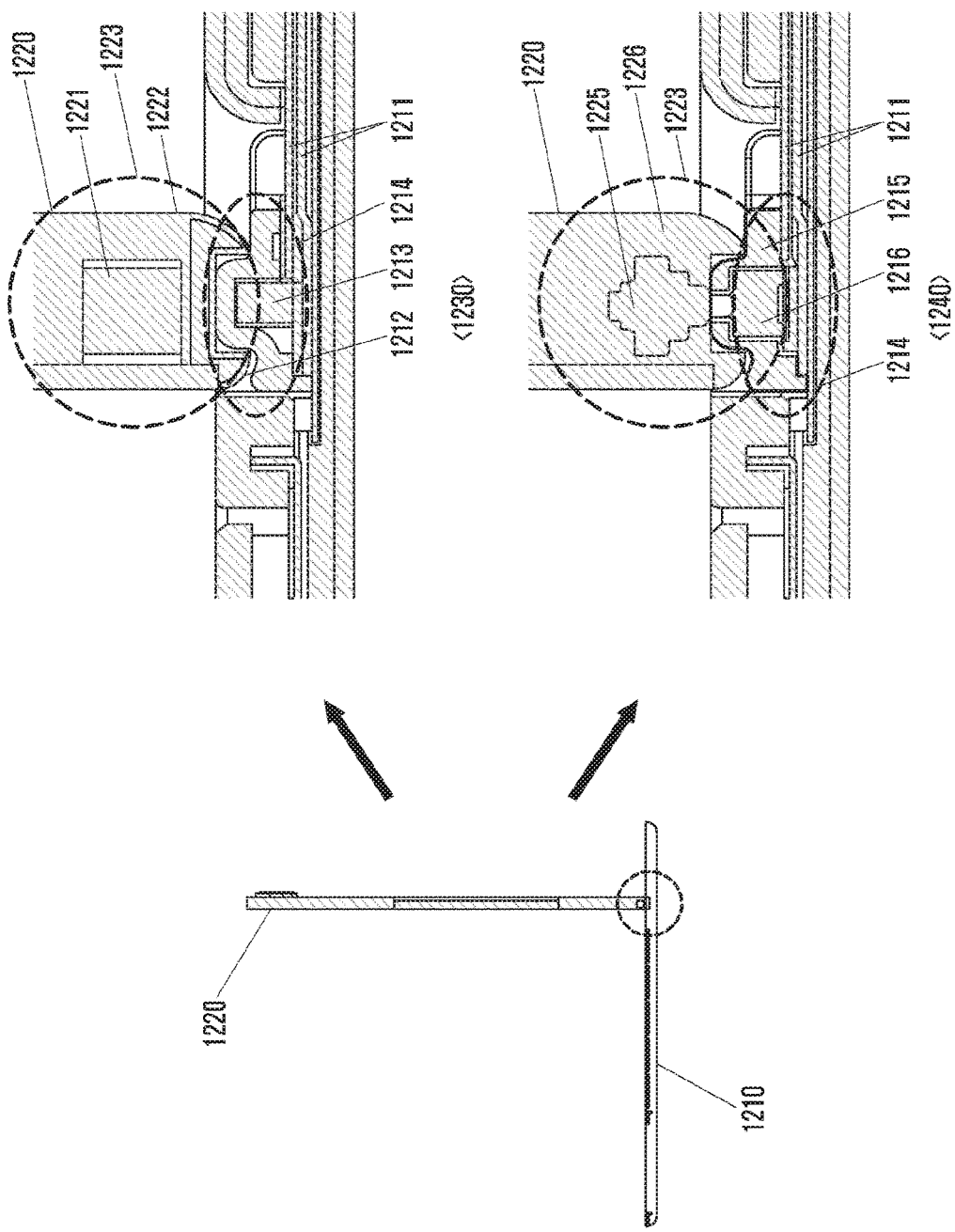
FIG. 12 is a cross-sectional view illustrating coupling of a first housing and a second housing of an electronic device according to various embodiments.

FIG. 12 is a cross-sectional view illustrating a state when a first housing 1210 (e.g., the first housing 600) and a second housing 1220 (e.g., the second housing 630) of the electronic device 101 are coupled according to various embodiments.

A reference numeral 1230 illustrates a coupling relationship by a magnetic force of at least one magnet 1213 included in the first housing 1210 and at least one magnet 1221 included in the second housing 1220 when the first housing 1210 and the second housing 1220 are coupled.

According to various embodiments, the first housing 1210 may include a first coupling structure 1214 (e.g., the first coupling structure 620). The first coupling structure 1214 may include a protrusion member 1212 (e.g., the protrusion member 623) and at least one magnet 1213. The first coupling structure 1214 may be connected to a moving member 1211 (e.g., the moving member 913) to provide a pivotal movement to the second housing 1220.

According to various embodiments, the second housing 1220 may include a second coupling structure 1223 (e.g., the second coupling structure 631). The second coupling structure 1223 may include a recessed member 1222 (e.g., the recessed member 633) and at least one magnet 1221.

According to various embodiments, when the first housing 1210 and the second housing 1220 are coupled, the protrusion member 1212 may be coupled to the recessed member 1222. When the first housing 1210 and the second housing 1220 are coupled, the protrusion member 1212 may be inserted into the recessed member 1222.

A reference numeral 1240 illustrates a coupling relationship of a socket 1216 (e.g., the socket 622) included in the first housing 1210 and a pogo pin member 1225 (e.g., the pogo pin member 632) included in the second housing 1220 when the first housing 1210 and the second housing 1220 are coupled.

According to various embodiments, the second coupling structure 1223 (e.g., the second coupling structure 631) may include the pogo pin member 1225 (e.g., the pogo pin member 632) and the recessed member 1222 (e.g., the recessed member 633). The recessed member 1222 may enable at least a portion (e.g., plunger) of the pogo pin member 1225 to be exposed to the outside.

According to various embodiments, when the first housing 1210 and the second housing 1220 are coupled, the pogo pin member 1225 whose at least a portion (e.g., plunger) is exposed to the outside may be coupled to the socket 1216. When the first housing 1210 and the second housing 1220 are coupled, a portion of the pogo pin member 1225 may be inserted into the socket 1216.

According to various embodiments, when the first housing 1210 and the second housing 1220 are coupled, the protrusion member 1212 may be coupled to the recessed member 1222. When the first housing 1210 and the second housing 1220 are coupled, the protrusion member 1212 may be inserted into the recessed member 1222.

Figure 13:
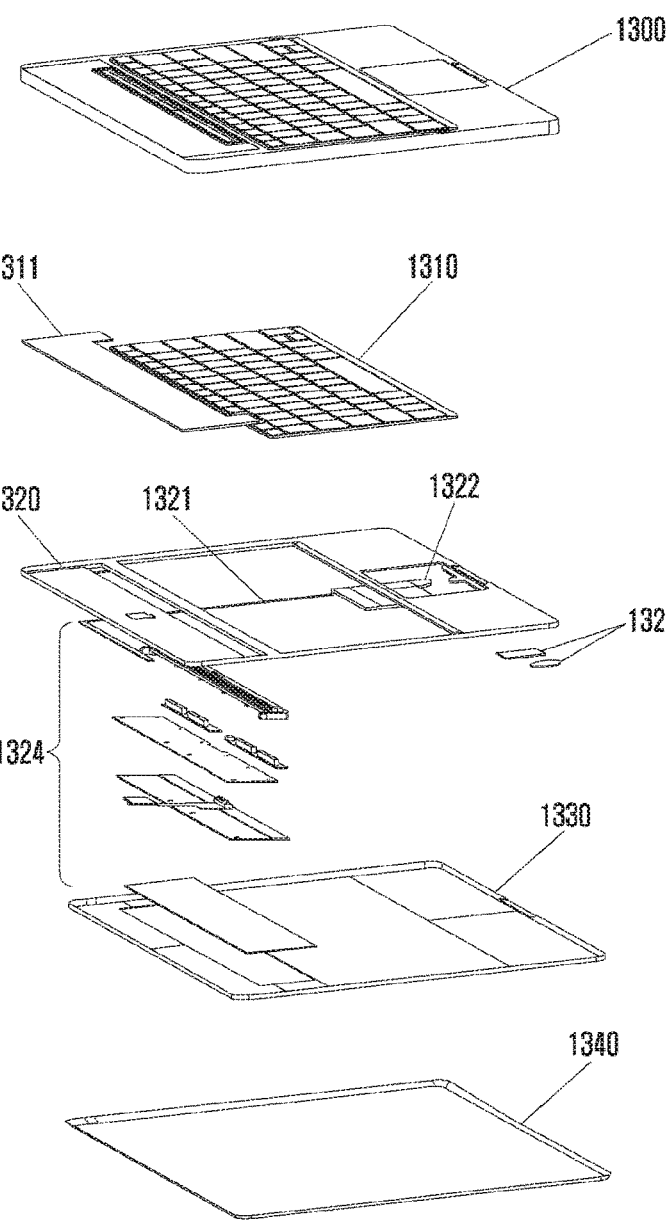
FIG. 13 is an exploded perspective view illustrating a first housing of an electronic device according to various embodiments.

FIG. 13 is an exploded perspective view illustrating the first housing 1300 (e.g., the first housing 600) of the electronic device 101 according to various embodiments.

According to various embodiments, the first housing 1300 may include a keyboard module 1310 and a sliding prevention member 1311 (e.g., rubber, silicon, and fiber) at an upper surface of the outside. The sliding prevention member 1311 may be disposed at an upper end portion of the keyboard module 1310.

According to various embodiments, at a low layer of the keyboard module 1310 (e.g., the input module 510), a front case 1320 may be disposed. The front case 1320 may be coupled to a rear case 1330 to form an external appearance of the first housing 1300. The front case 1320 may include the keyboard module 1310 at an upper layer.

According to various embodiments, a low layer of the front case 1320 may include at least one of a connection cable 1321, main board 1322, click pad 1323, and first coupling structure 1324. The connection cable 1321 may transfer an electrical signal output from the keyboard module 1310, main board 1322, and click pad 1323 to an electrical connector 1414 included in the first coupling structure 1324. The front case 1320 may include a recess extended in a major axis direction that can receive a second housing (e.g., the second housing 630) and the first coupling structure 1324.

According to various embodiments, the rear case 1330 is located at a low layer of the front case 1320 and may contain the connection cable 1321, the main board 1322, the click pad 1323, and the first coupling structure 1324 together with the front case 1320. A low layer of the rear case 1330 may include a protection case 1340. The protection case 1340 may be made of a material such as polyurethane or leather.

Figure 14:
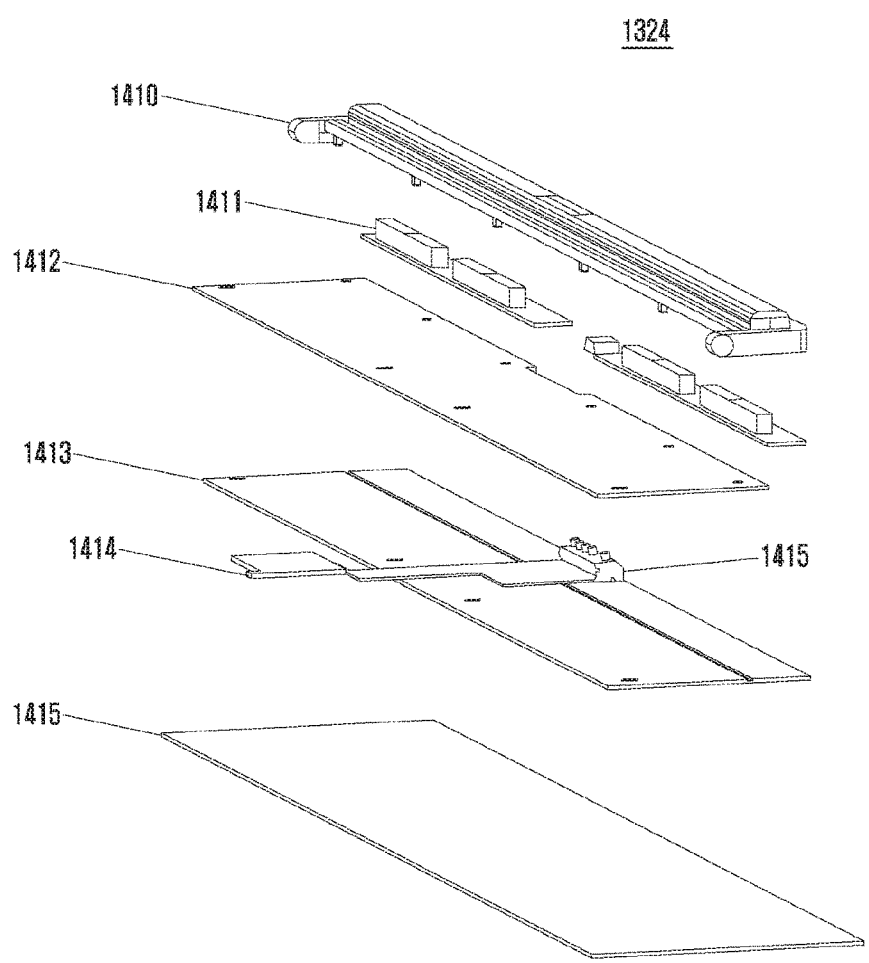
FIG. 14 is an exploded perspective view illustrating a first coupling structure of an electronic device according to various embodiments.

FIG. 14 is an exploded perspective view of the first coupling structure 1324 (e.g., the first coupling structure 620) of the electronic device 101 according to various embodiments.

According to various embodiments, the first coupling structure 1324 may include a protrusion member 1410 (e.g., the protrusion member 623), at least one magnet 1411 (e.g., at least one magnet 852), a first moving member 1412 (e.g., the moving member 913), a second moving member 1413 (e.g., the moving member 913), an electrical connector 1414, at least one pogo structure 1414 (e.g., the pogo structure 860), and a magnetic coupling member 1415 (the magnetic coupling member of FIG. 8).

According to various embodiments, the protrusion member 1410 may have a bar shape extended in a major axis direction of the first housing 1300, and the protrusion member 1410 may perform a cover function of protecting at least one magnet 1411 and at least one pogo structure 1414 included in the first coupling structure 1324.

According to various embodiments, at a low layer of the protrusion member 1410, at least one magnet 1411 may be disposed. At the low layer of the at least one magnet 1411, the first moving member 1412 may be disposed. At the low layer of the first moving member 1412, at least one pogo structure 1414 and an electrical connector 1414 may be disposed. The at least one pogo structure 1414 and the electrical connector 1414 may be connected. At a low layer of the at least one pogo structure 1414 and the electrical connector 1414, the second moving member 1413 may be disposed. At a low layer of the second moving member 1413, a magnetic coupling member 1415 may be disposed. The magnetic coupling member 1415 is made of a metal material, and when the second housing (e.g., the second housing 630) is not coupled to the first housing 1300, in order to prevent a floating or moving phenomenon, a lower portion of the protrusion member 1410 may be coupled to the at least one magnet 1411.

Figure 15:
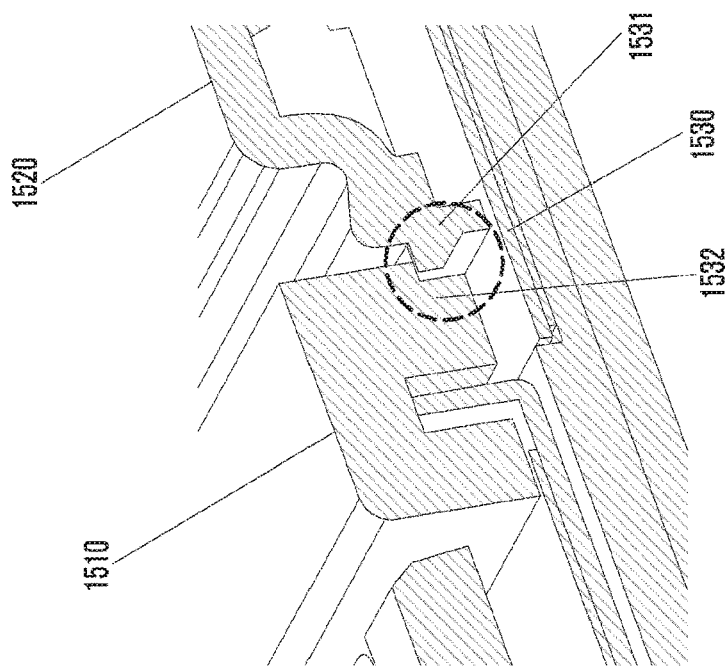
FIG. 15 is a perspective view illustrating coupling of a keyboard module and a protrusion member in an electronic device according to various embodiments.
Figure 15:
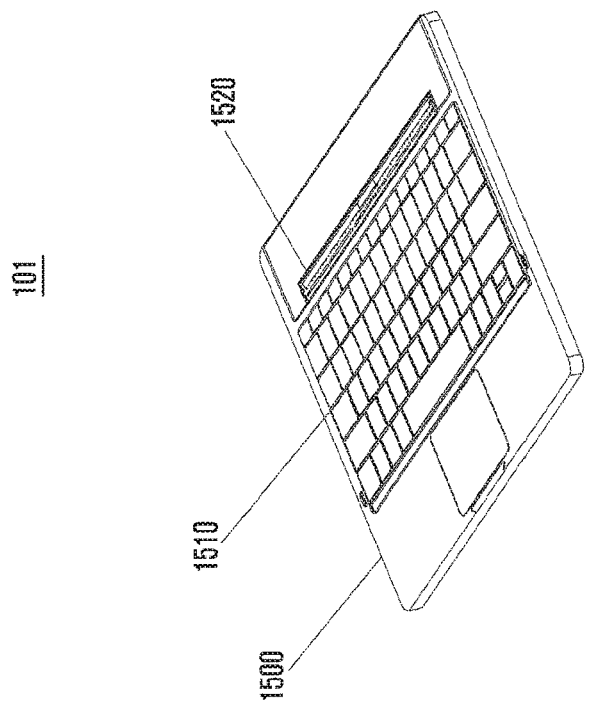

FIG. 15 is a perspective view illustrating coupling of a keyboard module 1510 (e.g., the keyboard module 1310) and a protrusion member 1520 (e.g., the protrusion member 623) in the electronic device 101 according to various embodiments.

According to various embodiments, the keyboard module 1510 and the protrusion member 1520 may perform hook coupling 1530. For the hook coupling 1530, at least a portion of the keyboard module 1510 may include an extended hook receiving member 1532, and at least a portion of the protrusion member 1520 may include an extended hook protrusion member 1531.

According to various embodiments, when the keyboard module 1510 and the protrusion member 1520 perform the hook coupling 1530, if a first housing (e.g., the first housing 600) and a second housing (e.g., the second housing 630) are not connected, the hook coupling 1530 may adjust the protrusion member 1520. As the first housing (e.g., the first housing 600) and the second housing (e.g., the second housing 630) are connected, when the second housing (e.g., the second housing 630) moves, the hook coupling 1530 is released and thus the second housing (e.g., the second housing 630) may move in various angles.

Figure 16:
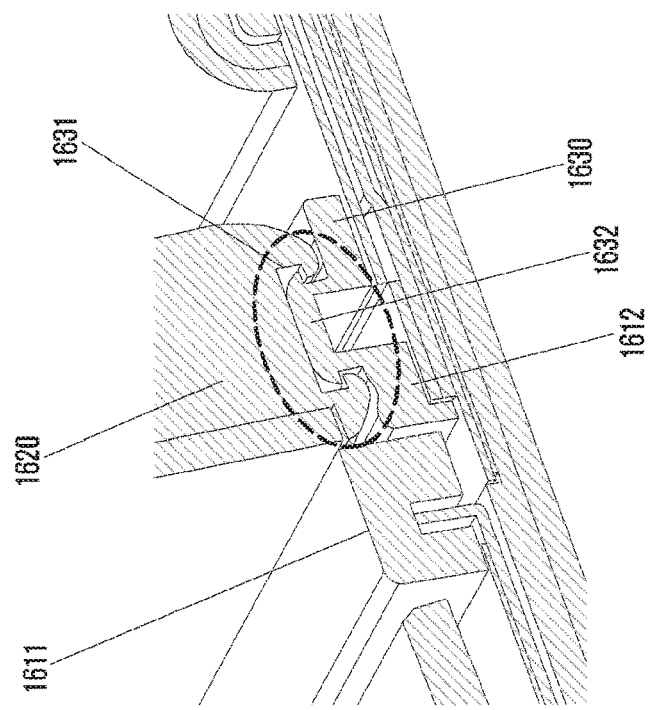
FIG. 16 is a perspective view illustrating coupling of a first housing and a second housing in an electronic device according to various embodiments.
Figure 16:
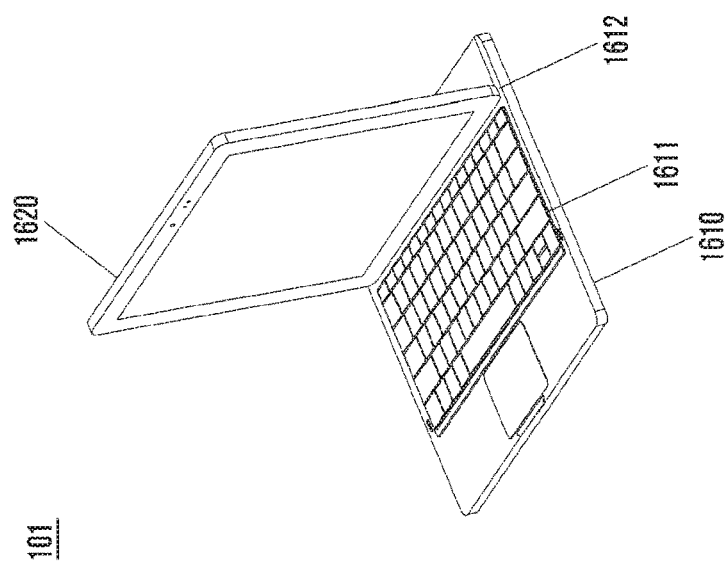

FIG. 16 is a perspective view illustrating a state when a first housing 1610 (e.g., the first housing 600) and a second housing 1620 (e.g., the second housing 630) are coupled in the electronic device 101 according to various embodiments.

According to various embodiments, the first housing 1610 and the second housing 1620 may perform hook coupling 1630. For the hook coupling 1630, at least a portion of a protrusion member 1612 (e.g., the protrusion member 623) of the first housing 1610 may include an extended hook protrusion member 1632.

According to various embodiments, at least a portion of a recessed member 1631 (e.g., the recessed member 633) of the second housing 1620 may include an extended hook receiving member. The recessed member of the second housing 1620 may be extended in at least a partial direction of a side member of the second housing 1620.

Figure 17:
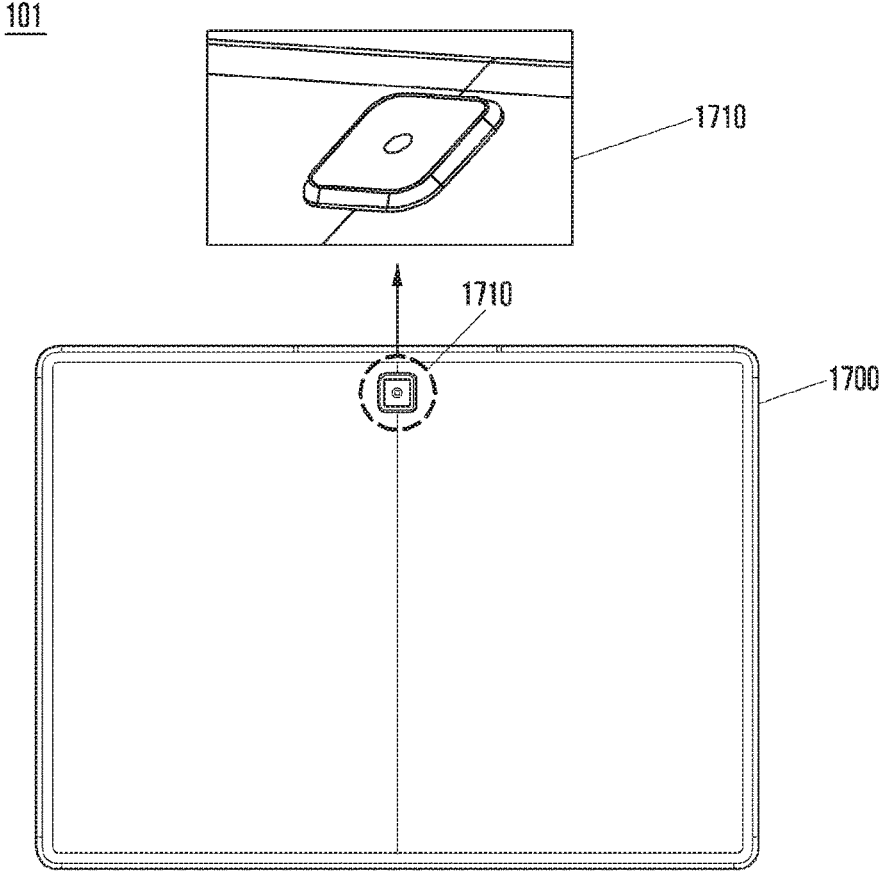
FIG. 17 is a perspective view illustrating an electronic device including a second housing having a camera module at a rear surface thereof and a cover that may be extended to one end of a first housing of an electronic device, according to various embodiments.
Figure 17:
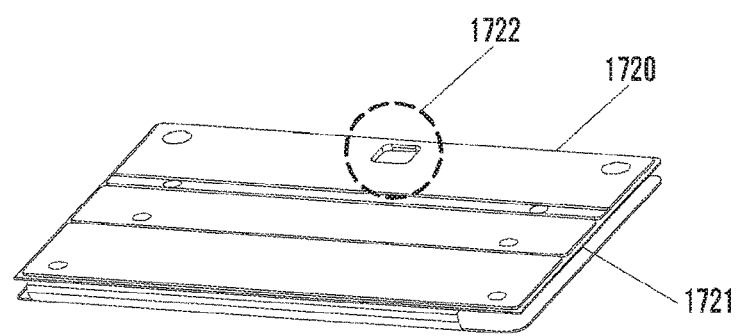

FIG. 17 is a perspective view illustrating a second housing 1700 (e.g., the second housing 630) including a camera module 1710 at a rear surface and a cover 1721 (e.g., the cover 330) that may be extended to one end of a first housing 1720 (e.g., the first housing 600) of the electronic device 101 according to various embodiments.

According to various embodiments, in order to couple to the second housing 1700 including the camera module 1710, the cover 1721 may include a hole 1722 that may be coupled to the camera module 1710.

According to various embodiments, at least a portion of the camera module 1710 may be protruded from a rear surface of the second housing 1700. When being coupled to the hole 1722 using the protruded camera module 1710, the cover 1722 and the second housing 1700 may be coupled with a binding force.

Figure 18:
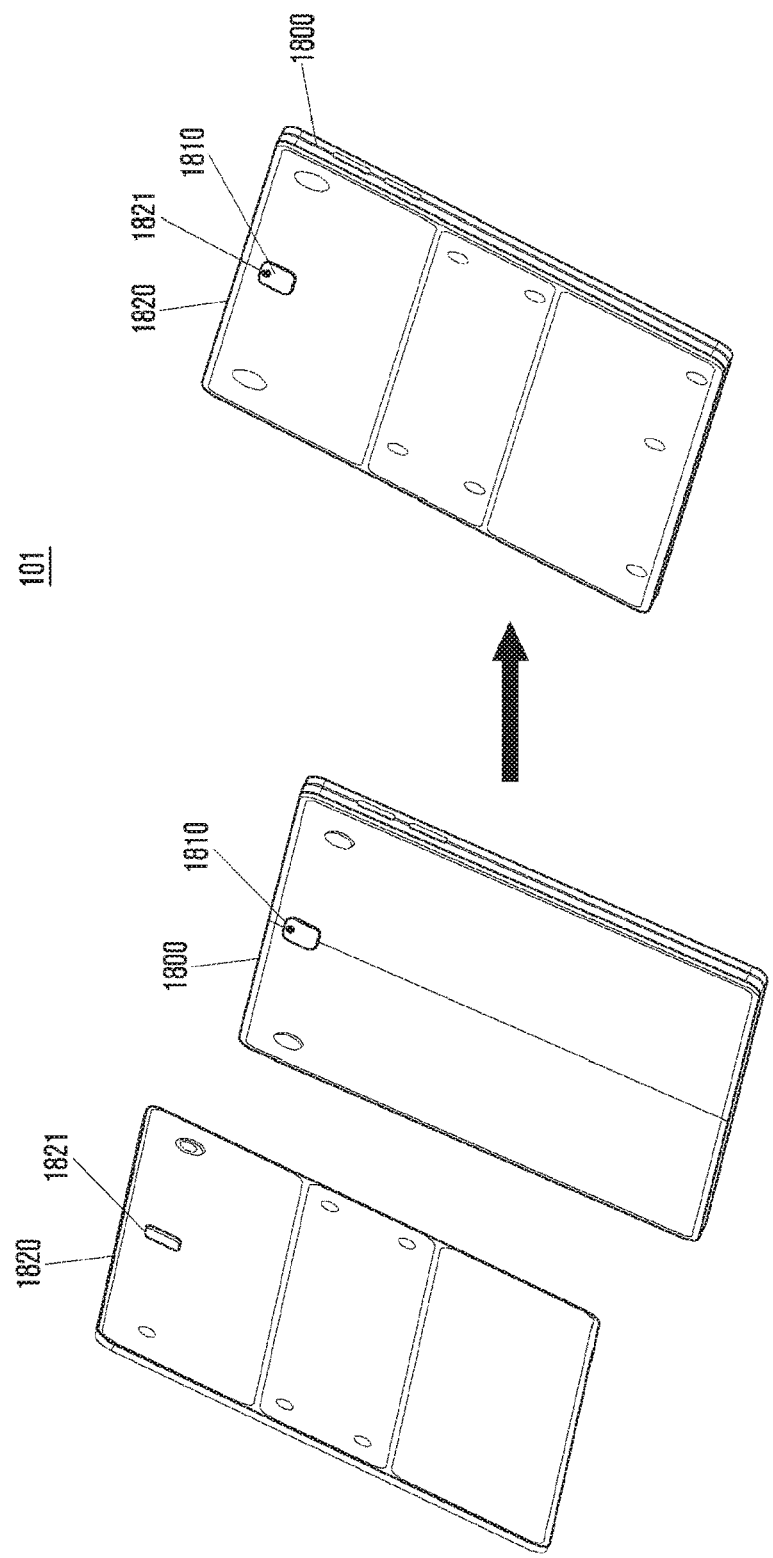
FIG. 18 is a perspective view illustrating a second housing including a magnet push button at a rear surface of the second housing and a cover that may be extended to one end of a first housing of an electronic device, according to various embodiments.

FIG. 18 is a perspective view illustrating a second housing 1800 (e.g., the second housing 630) including a magnet push button 1811 at a rear surface and a cover 1821 (e.g., the cover 330) that may be extended to one end of a first housing (e.g., the first housing 600) of the electronic device 101 according to various embodiments.

According to various embodiments, a rear surface of the second housing 1800 may include a camera module 1810 whose at least a portion is protruded from the rear surface and at least one magnet push button 1811. The at least one magnet push button 1811 may be coupled to correspond to at least one magnet protrusion structure (a magnet protrusion structure 1922 of FIG. 19) included in the cover 1821.

According to various embodiments, at least one magnet push button 1811 and at least one magnet protrusion structure (a magnet protrusion structure 1922 of FIG. 19) may be disposed to correspond.

According to various embodiments, at least one magnet push button 1811 and at least one magnet protrusion structure (a magnet protrusion structure 1922 of FIG. 19) may have opposite magnet polarity.

According to various embodiments, at least one magnet push button 1811 may be disposed at a portion of the upper end of a rear surface of the second housing 1800. At least one magnet protrusion structure (a magnet protrusion structure 1922 of FIG. 19) may be disposed at a portion of the upper end of the cover 1821.

Figure 19:
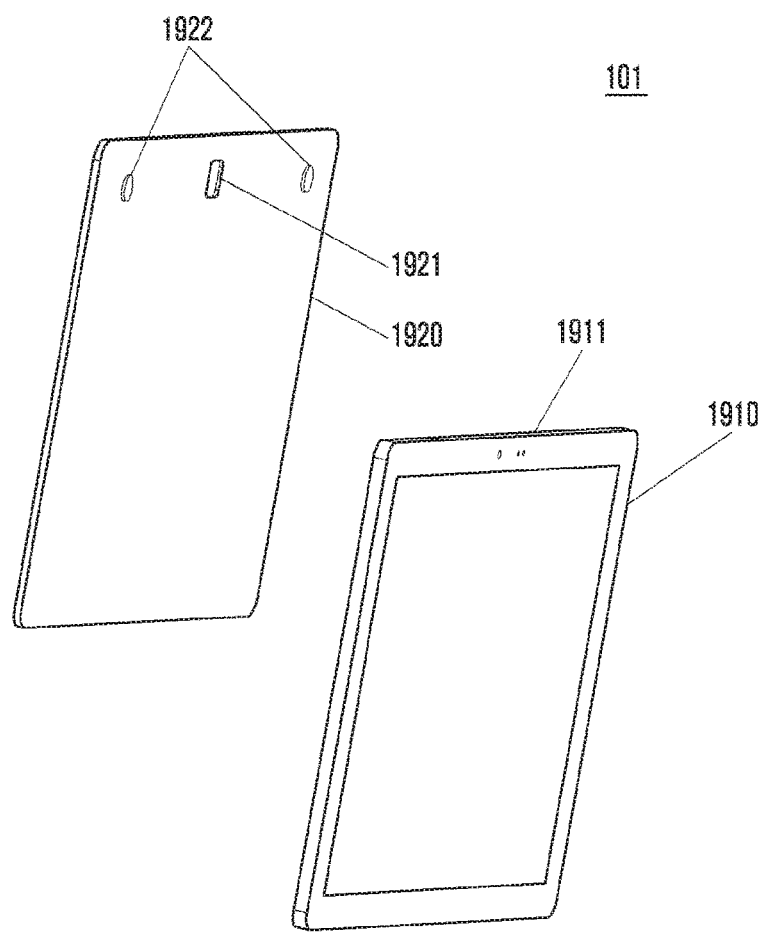
FIG. 19 is a perspective view illustrating a cover and second housing that may be extended to one end of a first housing of an electronic device, and that include a magnet protrusion structure according to various embodiments.

FIG. 19 is a perspective view illustrating a cover 1920 (e.g., the cover 330 and a second housing 1910 (e.g., the second housing 630) including the magnet protrusion structure 1922 and that may be extended to one end of a first housing (e.g., the first housing 600) of the electronic device 101 according to various embodiments.

According to various embodiments, a rear surface of a second housing 1910 may include at least one magnet push button (e.g., the magnet push button 1811) and a camera module (e.g., a camera module 1810) whose at least a portion is protruded from the rear surface. The at least one magnet push button (e.g., the magnet push button 1811) may be coupled to correspond to at least one magnet protrusion structure 1922 included in the cover 1920.

According to various embodiments, at least one magnet push button (e.g., the magnet push button 1811) and at least one magnet protrusion structure 1922 may be disposed to correspond.

According to various embodiments, at least one magnet push button (e.g., the magnet push button 1811) and at least one magnet protrusion structure 1922 may have opposite magnet polarity.

According to various embodiments, at least one magnet push button (e.g., the magnet push button 1811) may be disposed at a portion of the upper end of a rear surface of the second housing 1910. At least one magnet protrusion structure 1922 may be disposed at a portion of the upper end of the cover 1920.

Figure 20:
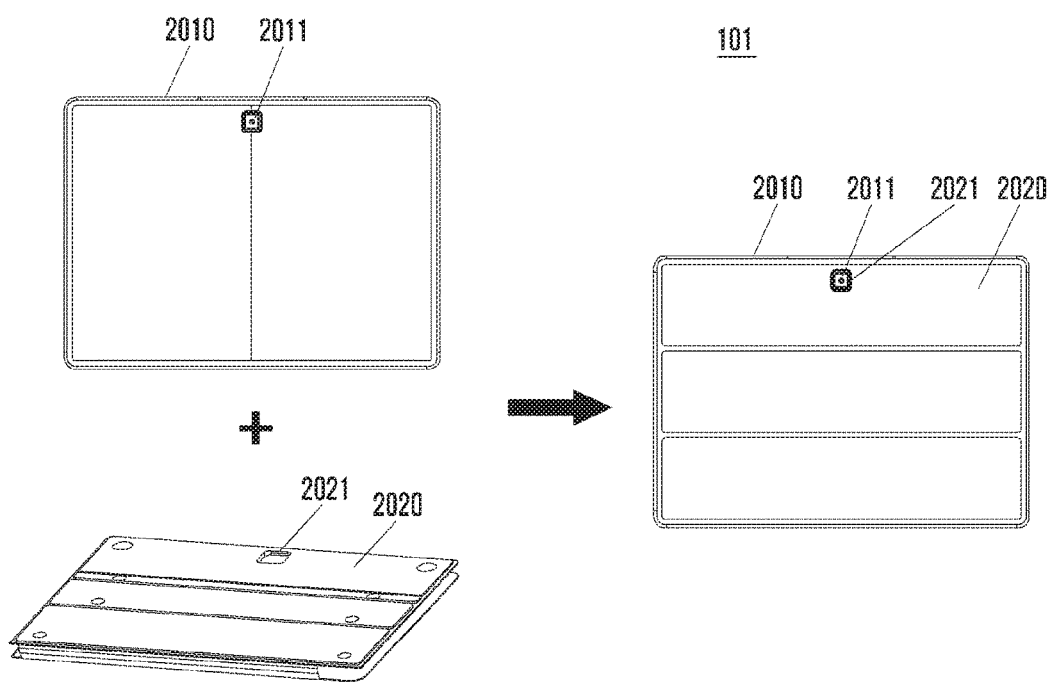
FIG. 20 is a perspective view illustrating a second housing including a camera module at a rear surface and a cover that may be extended to one end of a first housing of an electronic device according to various embodiments.

FIG. 20 is a perspective view illustrating a second housing 2010 (e.g., the second housing 630) including a camera module 2011 at a rear surface and a cover 2020 (e.g., the cover 330) that may be extended to one end of a first housing 2000 (e.g., the first housing 600) of the electronic device 101 according to various embodiments.

According to various embodiments, in order to couple to the second housing 2010 including the camera module 2011, the cover 2020 may include a hole 2021 that may be coupled to the camera module 2011.

According to various embodiments, at least a portion of the camera module 2011 may be protruded from a rear surface of the second housing 2010. When being coupled to the hole 2021 using the protruded camera module 2011, the cover 2020 and the second housing 2010 may be coupled with a binding force.

According to various embodiments, in order to improve a binding force of the cover 2020 and the second housing 2010, by disposing a deco at the hole 2021 of the cover 2020, a direct wall may be formed and by disposing a deco at the protruded camera module 2011, a direct wall may be formed.

Figure 21:
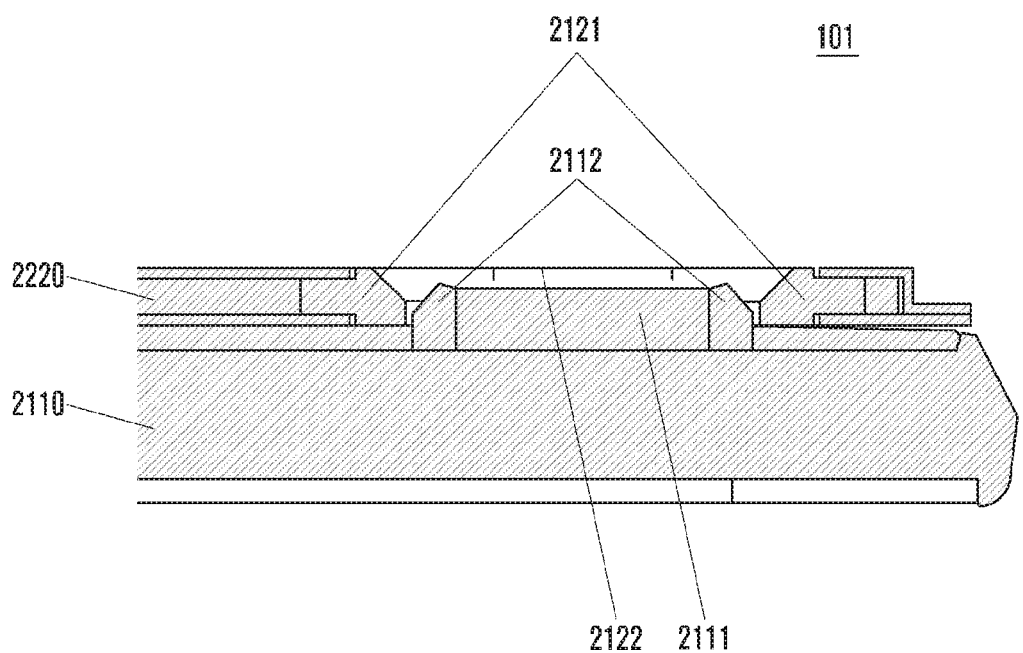
FIG. 21 is a perspective view illustrating a second housing including a camera module at a rear surface and a cover that may be extended to one end of a first housing of an electronic device, according to various embodiments.

FIG. 21 is a perspective view illustrating a second housing 2110 (e.g., the second housing 2010) including a camera module 2111 (e.g., the camera module 2011) at a rear surface and the cover 2120 (e.g., the cover 2020) that may be extended to one end of a first housing (e.g., first housing 2000) of the electronic device 101 according to various embodiments.

According to various embodiments, in order to couple to the second housing 2110 including the camera module 2111, the cover 2120 may include a hole 2122 that may be coupled to the camera module 2111.

According to various embodiments, at least a portion of the camera module 2111 may be protruded from a rear surface of the second housing 2110. When coupling to the hole 2122 using the protruded camera module 2111, the cover 2120 and the second housing 2110 may be coupled with a binding force.

According to various embodiments, in order to improve a binding force of the cover 2120 and the second housing 2110, by disposing at least one first deco 2121 at the hole 2122 of the cover 2120, a direct wall may be formed, and by disposing a second deco 2112 at the protruded camera module 2111, a direct wall may be formed.

Figure 22:
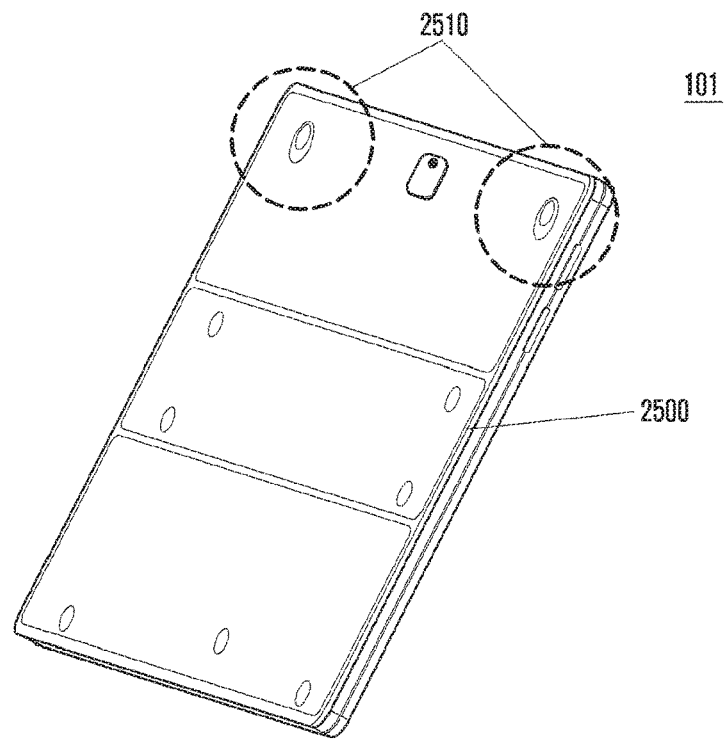
FIG. 22 is a perspective view illustrating a second housing including a magnet push button at a rear surface and a cover that may be extended to one end of a first housing and that include a magnet protrusion structure, according to various embodiments.
Figure 22:
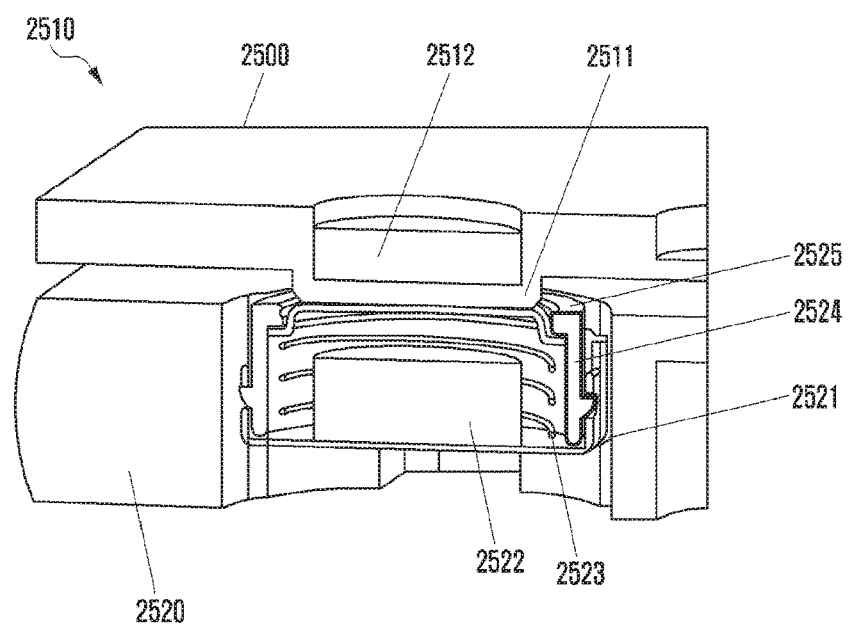

FIG. 22 is a perspective view illustrating a second housing 2520 including a magnet push button 2521 at a rear surface and a cover 2500 (e.g., the cover 330) that may be extended to one end of a first housing (e.g., the first housing 600) of FIGS. 18 and 19 and including a magnet protrusion structure 2510.

The magnet protrusion structure 2510 may include a protrusion structure 2511 and at least one magnet 2512, and may include at least one magnet 2512 within the protrusion structure 2511. The second housing 2520 may include a magnet push button 2521. The magnet push button 2521 may include at least one magnet 2522, an elastic member 2523, a protrusion receiving structure 2524, and a push deco 2525. The protrusion receiving structure 2524 may maintain a shape of the at least one magnet 2522, the elastic member 2523, and the push deco 2525.

When the cover 2500 and the second housing 2520 are coupled, at least one magnet 2522 of the magnet push button 2521 and at least one magnet 2512 of the magnet protrusion structure 2510 having opposite magnet polarity are coupled with a magnetic force, and as the protrusion structure 2511 pushes the push deco 2525 with a magnetic force, an elastic force of the elastic member 2523 is in equilibrium and thus the at least one magnet 2522 and the at least one magnet 2512 are coupled.

A term "module" used in this document includes a unit configured with hardware, software, or firmware and may be interchangeably used with a term such as a logic, logic block, component, or circuit. The "module" may be an integrally configured component or a minimum unit or a portion thereof that performs at least one function. The "module" may be implemented mechanically or electronically and may include at least one of, for example an Application-Specific Integrated Circuit (ASIC) chip, Field-Programmable Gate Arrays (FPGAs), and a programmable logic device that perform any operation and that are known or to be developed in the future.

At least a portion of a device (e.g., modules or functions thereof) or a method (e.g., operations) according to various embodiments may be implemented with an instruction stored at a computer readable storage medium (e.g., the memory 130) in a form of a program module. When the instruction is executed by a processor (e.g., the processor 120), the processor may perform a function corresponding to the instruction. The computer readable storage medium may be, for example the memory 130.

The computer readable recording medium may include a hard disk, floppy disk, magnetic medium (e.g., magnetic tape), optical media (e.g., Compact Disc Read Only Memory (CD-ROM), Digital Versatile Disc (DVD)), magneto-optical media (e.g., floptical disk), and a hardware device (e.g., Read Only Memory (ROM), Random Access Memory (RAM), or flash memory). Further, a program instruction may include a high-level language code that may be executed by a computer using an interpreter as well as a machine language code generated by a compiler. In order to perform operation of various embodiments, the above-described hardware device may be configured to operate as at least one software module and vice versa.

A module or a programming module according to various embodiments may include at least one of the foregoing elements, may omit some elements, or may further include additional other elements. Operations performed by a module, a programming module, or another constituent element according to various embodiments may be executed with a sequential, parallel, repeated, or heuristic method. Further, some operations may be executed in different orders, may be omitted, or may add other operations. Embodiments disclosed in this document are suggested for description and understanding of technology contents and do not limit the scope described in this document. Therefore, it should be analyzed that a range of this document includes entire changes or various other embodiments based on the scope and spirit of this document.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device, comprising:
a first housing comprising a first surface and a second surface at a rear surface opposite of the first surface and a coupling structure disposed on the first surface; and
a second housing configured to be coupled to the first housing, wherein the second housing comprises a third surface, a fourth surface at a rear surface opposite of the third surface, and a side member that encloses space between the third surface and the fourth surface,
wherein the coupling structure is connected to a portion of the side member of the second housing, when the second housing is coupled to the first housing,
wherein the coupling structure comprises a recess, a moving member and a retainer system,
wherein when the second housing is coupled to the first housing, the recess extends in a first direction along a portion of the side member and the moving member is configured to perform a pivotal movement about a shaft extended in the first direction,
wherein the retainer system comprises a protrusion member that is connected to the moving member, a first magnet located within the protrusion member, and a metal material magnetically coupled to the first magnet, when the second housing is not completely coupled to the first housing,
wherein the first housing comprises a cover configured to cover at least a portion of the second housing,
wherein the second housing comprises a camera module having a protruding camera module portion at the fourth surface,
wherein the cover comprises a hole corresponding to the protruding camera module portion,
wherein the protruding camera module portion and the hole have a binding force to each other, when the cover and the fourth surface of the second housing are coupled,
wherein the hole comprises a first deco that is configured to form a direct wall, wherein the protruding camera module portion comprises a second deco configured to form another direct wall, and wherein the protruding camera module portion and the hole have a binding force with coupling of the first deco and the second deco, when the cover and the fourth surface of the second housing are coupled.

2. The electronic device of claim 1, wherein the moving member comprises an electrical connector.

3. The electronic device of claim 2, wherein the electrical connector comprises a plurality of movable conductive pins.

4. The electronic device of claim 1, wherein the side member comprises a second magnet that is coupled to the first magnet when the second housing is coupled to the first housing.

5. The electronic device of claim 4, wherein a magnetic force between the first magnet and the second magnet is greater than a second magnetic force between the first magnet and the metal material.

6. The electronic device of claim 1, wherein the first housing comprises a keyboard disposed at the first surface.

7. The electronic device of claim 1, wherein the second housing comprises a display disposed at the third surface.

8. The electronic device of claim 1, wherein the retainer system comprises a pogo structure, wherein the pogo structure comprises the protrusion member having a socket included therein.

9. The electronic device of claim 8, wherein the side member comprises:
a recessed member extended in at least a partial direction; and
a pogo pin member included within the recessed member and having at least a portion exposed to the outside,
wherein the socket and the pogo pin member are coupled and the protrusion member and the recessed member are coupled, when the second housing is coupled to the first housing.

10. The electronic device of claim 1, wherein the cover comprises a magnet protrusion structure, and
wherein the second housing comprises a magnet push button configured to be coupled to the magnet protrusion structure at the fourth surface.

11. The electronic device of claim 1, wherein the retainer system comprises a hook protrusion member,
wherein the second housing comprises a hook receiving member that configured to be coupled to the hook protrusion member in at least a portion of the side member, and
wherein the hook protrusion member and the hook receiving member are hook coupled, when the second housing is coupled to the first housing.

12. The electronic device of claim 11, wherein the second housing is configured to move in various angles.

13. The electronic device of claim 11, wherein the protrusion member of the first housing comprises an extended hook protrusion member.

14. The electronic device of claim 13, wherein the second housing comprises an extended hook receiving member.

15. The electronic device of claim 10, wherein the magnet protrusion structure and the magnet push button comprise opposite magnet polarity.

16. The electronic device of claim 9, wherein the pogo pin member comprises a plunger portion configured to be inserted into the socket.

* * * * *